United States Patent
Crank

(10) Patent No.: US 7,436,322 B2
(45) Date of Patent: Oct. 14, 2008

(54) FLIGHT RECORDER SYSTEM WITH REMOTE WIRELESS ACCESS

(76) Inventor: Kelly C Crank, 3670 SE. El Camino Dr., Portland, OR (US) 97080

( * ) Notice: Subject to any disclaimer, the term of this patent is extended or adjusted under 35 U.S.C. 154(b) by 0 days.

(21) Appl. No.: 11/617,918

(22) Filed: Dec. 29, 2006

(65) Prior Publication Data

US 2007/0150126 A1  Jun. 28, 2007

Related U.S. Application Data

(62) Division of application No. 10/269,169, filed on Oct. 10, 2002, now Pat. No. 7,158,053.

(60) Provisional application No. 60/328,620, filed on Oct. 10, 2001.

(51) Int. Cl.
    *G08B 23/00*  (2006.01)
(52) U.S. Cl. .................. 340/945; 701/14; 701/35
(58) Field of Classification Search .......... 340/945; 713/200; 455/266; 244/190; 701/14, 35, 701/29; 375/130; 360/5; 73/587
See application file for complete search history.

(56) References Cited

U.S. PATENT DOCUMENTS

| | | | |
|---|---|---|---|
| 4,086,632 A | 4/1978 | Lions | |
| 4,121,287 A | 10/1978 | Leal et al. | |
| 4,210,899 A | 7/1980 | Swonger et al. | |
| 4,695,013 A | 9/1987 | Trampnau | |
| 4,706,091 A * | 11/1987 | Scott | 342/42 |
| 4,856,072 A | 8/1989 | Schneider et al. | |
| 5,157,615 A | 10/1992 | Brodegard et al. | |
| 5,392,052 A * | 2/1995 | Eberwine | 342/357.09 |
| 5,548,647 A | 8/1996 | Naik et al. | |
| 5,552,993 A * | 9/1996 | Buchwitz et al. | 701/213 |
| 5,570,095 A | 10/1996 | Drouilhet, Jr. et al. | |
| 5,574,648 A | 11/1996 | Pilley | |
| 5,640,297 A | 6/1997 | Labaze | |
| 5,714,948 A | 2/1998 | Farmakis et al. | |
| 5,798,458 A * | 8/1998 | Monroe | 73/587 |
| 5,802,199 A | 9/1998 | Pare, Jr. et al. | |
| 5,890,079 A | 3/1999 | Levine | |
| 5,902,351 A | 5/1999 | Streit et al. | |
| 5,933,098 A | 8/1999 | Haxton | |
| 5,938,706 A | 8/1999 | Feldman | |
| 5,952,961 A | 9/1999 | Denninger | |
| 5,974,349 A | 10/1999 | Levine | |
| 6,006,159 A | 12/1999 | Schmeir et al. | |
| 6,040,783 A | 3/2000 | Houvener et al. | |
| 6,045,039 A | 4/2000 | Stinson et al. | |

(Continued)

FOREIGN PATENT DOCUMENTS

WO  02099769  12/2002

*Primary Examiner*—Brent Swarthout
(74) *Attorney, Agent, or Firm*—John Smith-Hill; Smith-Hill and Bedell

(57) ABSTRACT

A flight recorder system with remote wireless access, for use aboard an aircraft, includes at least one microphone for monitoring sounds within a cockpit of the aircraft and producing digital audio data. The digital audio data is indexed relative to aircraft position and time and is stored. A download command is initiated and prompts stored data to be read and transmitted to a ground-based facility for evaluation. A video camera may be provided for acquiring and recording images within the cockpit.

19 Claims, 13 Drawing Sheets

U.S. PATENT DOCUMENTS

| | | |
|---|---|---|
| 6,188,956 B1 | 2/2001 | Walters |
| 6,199,008 B1 | 3/2001 | Aratow et al. |
| 6,281,832 B1 | 8/2001 | McElreath |
| 6,308,045 B1 | 10/2001 | Wright et al. |
| 6,337,621 B1 | 1/2002 | Ogino et al. |
| 6,424,249 B1 | 7/2002 | Houvener |
| 6,496,107 B1 | 12/2002 | Himmelstein |
| 6,512,529 B1 | 1/2003 | Janssen et al. |
| 6,580,450 B1 * | 6/2003 | Kersting et al. ............. 348/148 |
| 6,624,739 B1 | 9/2003 | Stobbe |
| 6,658,572 B1 | 12/2003 | Craig |
| 6,690,317 B2 * | 2/2004 | Szeto et al. ............... 342/26 R |
| 6,735,505 B2 | 5/2004 | Levine |
| 6,798,886 B1 * | 9/2004 | Smith et al. ................... 381/61 |
| 6,819,219 B1 | 11/2004 | Bolle et al. |
| 6,831,912 B1 * | 12/2004 | Sherman ..................... 370/349 |
| 7,113,852 B2 * | 9/2006 | Kapadia et al. ............... 701/33 |
| 2001/0020251 A1 * | 9/2001 | Sheikh et al. ............... 709/224 |

* cited by examiner

Data Acquisition

FIFO Data Transfer

LIFO Data Transfer

Indexed Data Transfer

FLIGHT RECORDER SYSTEM WITH REMOTE WIRELESS ACCESS

CROSS-REFERENCE TO RELATED APPLICATION

This application is a divisional of U.S. patent application Ser. No. 10/269,169filed Oct. 10, 2002, now Patent 7,158, 053, and claims benefit of the date of filing of U.S. Provisional Application No. 60/328,620 filed Oct. 10, 2001.

BACKGROUND OF THE INVENTION

This invention relates to a method and apparatus for tracking aircraft and securing against unauthorized access.

Increasing demands upon the systems, methods and infrastructure of commercial aviation have prompted advances in technology pertaining to aircraft surveillance and communication. These systems which include ADS, ADS-B and FANS have enabled reduction of aircraft separation, and improvement in Air Traffic Control management of aircraft within coverage of regional airspace.

Despite varied solutions presented by existing and emerging technologies, little effort or advancements have been made that may adequately protect against recurrence of the tragic events of Sep. 11, 2001.

Reinforcement of cockpit doors and proposed arming of airline pilots provide physical barrier and defensive deterrence against aggressive actions of those harboring malicious intent relative to airline industry. Unfortunately, these methods substantially increase cost for retrofitting aircraft, but fail to protect against access gained through forged or stolen flight crew identification. Additionally, reinforced cockpit doors may be compromised at the point ingress/egress of the flight crew into the area of the cockpit.

Existing procedural measures rely upon the pilot and co-pilot to detect any intrusion into the cockpit, and notify regional ATC through textual input of emergency squawk code(s) into the Mode-S transponder or satellite-based datalink. Encoding of codes or textual messages failed adequately alert ATC of breach of the flight deck of any of the aircraft involved in the Sep. 11, 2001 hijackings.

Objective of the present invention, was therefore, a means of identifying authorized personnel with secondary comprehensive monitoring of the controlled space, sufficient to detect and exclude non-authorized personnel from the controlled space. Detected breach of the present invention permit immediate notification of ATC and authorities through initiation of an automatic alert code by primary and secondary means of wireless communication, thus reducing risk of system compromise.

Existing surveillance systems, such as ADS and FANS enable approximations of an aircraft's position in relationship to navigational lines or transmitted course intent, but fail to correlate the location of an aircraft outside of certain navigational boundaries, nor do these systems correlate precise positional representation of an aircraft in relationship to detailed geographic display of the underlying terrain. In the event of a compromise of a transponder or operational failure, ATC personnel are hampered in determining relative location of an aircraft.

Certain objectives of the present invention include detailed graphic display of an aircraft's position in relationship to identifiable geographic detail, including but not limited to, correlation of flight path or deviations relative to cities, buildings or landmarks, controlled spaces, waterways, topographical detail or emergency response facilities. It was an additional objective to provide means of automatic ground-based vector display to the nearest primary or secondary airports, in the event an aircraft encountered difficulty.

Existing and emerging technologies permit approximations of aircraft location, relative to assigned navigational tracks for inter-continental travel. While existing means enable improved air traffic management over vast oceanic surfaces, they are less useful in the unlikely event the aircraft fails to reach its destination.

It was an essential purpose of the current invention to develop a means for an aircraft to determine an imminent controlled or uncontrolled flight into terrain, with automatic notification of the nearest Search And Rescue or response facilities, minutes prior to the aircraft's crash (Net Terminal Location). This objective included automatically generated geographic-correlated map display, in which a reverse vector line provides detail of compass heading and nautical miles to the identified latitude and longitude of the aircraft's Net Terminal Location.

Current or proposed surveillance systems rely upon satellite transmission of comprehensive positional data, including; aircraft identification, velocity (airspeed), elevation, course heading, latitude, longitude, and course intent with some systems also reporting control surface settings. There are currently over three thousand aircraft in continual operation over the United States at any given time, with projections for substantial increase in the coming years, placing an ever increasing demand upon existing satellite systems.

It is an objective of the present invention to decrease the need of aircraft to transmit lengthy positional coordinates, while retaining ability to determine the position of the aircraft on a three-dimensional basis from a shorter positional transmission. The realization of this objective may reduce cost of satellite transmission, and increase efficiency of satellites to handle increasing numbers of aircraft in the future.

Historically, aircraft safety has been enhanced by extracting and analyzing data contained in one or more on-board flight recorders. These systems, include CVR (Cockpit Voice Recorders) and DFDR (Digital Flight Data Recorders). Analysis of existing recorders is limited to retrieval after a plane has crashed, and often these recorders cannot be located, or have sustained damage that prohibit obtaining useful data or recordings.

Objectives of the present invention included ability to record audio, video and data in separate channels in multiple recorder stages, including a rapidly addressable buffer array which permits programming the length of recording time commensurate with flight duration, and a secondary non-volatile data storage medium sufficient for archive storage of higher resolution audio and video. Development goals included ability to remotely access either recording stage, transmitting data in FIFO (First In First Out), Indexed Access (identified record, or a range between two indexes) and LIFO (Last In First Out), which permits immediate download of the most current recording. This enables download of data or audio related to issuance of an alarm or condition, first.

The primary focus of the present invention is to increase safety of the aircraft, and the respective passengers onboard.

Proposed or existing technologies pertain to recording or remote access relative to mechanical conditions of the respective aircraft, or advocate continual transmission of flight recorder voice, video and data to a ground-based facility where it is recorded.

The present invention primarily records audio, video and data in separate channels onboard an aircraft or vehicle, and then transmits, upon demand or prerequisite circumstance to a ground-based facility where it is analyzed. This reduces demand upon satellite transmission, while reducing the number of personnel and data storage space needed to monitor aircraft.

Additionally, proposed systems have an inherent problem if they advocate continual transmission of audio and data in real-time, or near real-time. If there is a break in satellite or RF communication continuity, then data may either be lost, or contain blank areas corresponding to the period of communication lapse.

The present invention uses compression algorithms, and burst or packet communication with parity to assure that all elements that are transmitted, are properly received by the ground-based receiving center. Additionally, the present invention permits download of data, as many times as desired without posing an interference to incoming or previously recorded data.

SUMMARY OF THE INVENTION

The present invention illustrates means of cost-effective global surveillance and tracking, enabling dynamic aircraft positional monitoring of precise correlated geographic specificity. Recent events related to aviation, highlight security and the need for monitoring to enable precise location of aircraft in relationship to geographic locations and landmarks.

Existing and proposed systems such as ADS, ADS-B and FANS-1A provide improved surveillance over broader areas not served by primary or secondary radar, yet are limited to establishing aircraft position, relative to existing navigational lines or transmitted aircraft intent. This places higher responsibility upon the judgment of ATC personnel to deductively correlate aircraft position with the corresponding geographic surroundings.

The present invention rely upon GNSS derived positional data, and secondary incremental wireless transmissions to ground-based receiving centers. The incremental separation between each sequential positional transmission is dependent upon the aircraft's position in relationship to the underlying terrain.

Existing systems rely upon transmission of positional data from which positional changes of the aircraft may be determined. These positional reports include, Velocity, current compass heading, latitude, longitude, altitude and course intent. The present invention requires transmission of fewer data elements, latitude, longitude and altitude from which the ground-based receiving center uses the time separation between transmissions to calculate secondary data, including compass heading, deviation, current and average speed, distance, and rate of descent. By reducing the extent of each positional transmission, the present invention provides more efficient use of satellite, or other wireless communications methods, while enabling a cost savings for equipped aircraft.

Algorithms employed by the ground-based receiving center(s) enable additional novel features, including an automatic vector line to the nearest primary and/or secondary airport in the event an aircraft encounters difficulties. The system also produces a corresponding display of compass heading and distance to the vectored locations.

Additionally, GNSS sample rate and corresponding transmission of positional coordinates increase in relationship to the underlying terrain, permitting more rapid calculation of glide path. In the event determination is made by the airborne element of an imminent crash, trajectory is analyzed in relationship to time, distance and altitude from which latitude and longitude of the aircraft's net terminal location is determined. Immediate transmission to the nearest search and rescue or response facilities and geographic display of the aircraft's last reported coordinates (LRC), and the distance and compass heading from the response facilities back to the aircraft.

Additional alert systems specified within the present invention may either be determined by the equipped aircraft, or the ground-based centers. Methods of re-checking and verifying alert codes decrease chance of error. Codes include, Code 7600, deviation from flight parameter, Code 7700 non-reporting aircraft (absence of positional coordinates), Code 7800 net terminal location and Code 7500 detection of intruder within the controlled space or cockpit. The preferred embodiment provide for concurrent transmission of alert codes by Satellite and Mode-S transponder, thus reducing chance of compromise of a single system.

The present invention provides comprehensive solutions for aircraft security concerns through a means of biometric identification of flight crew prior to take off. In the present invention, text-dependent voice biometrics are relied upon for indexing stored parameters of the known authorized person's voice. Log-on procedure is conducted concurrently between two parallel systems, using an encrypted satellite link. All personnel are required to obtain concurring approval prior to departure. From the point of authorization, all changes are locked out until the aircraft safely reaches it's destination.

Biometric monitoring aspect of the present invention is initiated following crew authorization and continues until the aircraft or vehicle safely reaches it's destination. If any voice is detected that differs from the logged authorized personnel, an alert (Code 7500) is transmitted to the ground-based receiving center. Upon verification, the receiving center Queries (download command) the on-board flight recorder system, for wireless transmission of the contents, while the aircraft is still in the air.

The present invention provides a means of extracting a time-date and position indexed spectrogram, from which comparison may be made by appropriate agencies or personnel to determine the identity of the alleged intruder. Additionally, elements of this same display enables personnel to advance or reverse aircraft acquired audio The referenced flight recorder aspect of the present invention contains multiple stages, which may function independently or collectively as an integrated system. Elements include a solid state buffer array with definable recording duration or depth, corresponding to the duration of individual flights or applications. Recording time exceed existing CVR (Cockpit Voice Recorder), and the separate indexed channels of audio, video and data may be accessed remotely by wireless means.

A non-volatile data storage device associated with the flight recorder system of the present invention, permit archive storage in a crash-survivable enclosure. In one embodiment, robust magneto-optical means is employed with removable 9 GB platters or cartridges.

Either system may be remotely downloaded using compression algorithms, and permit transfer in FIFO (First In First Out), Indexed Access or LIFO (Last In First Out).

BRIEF DESCRIPTION OF THE DRAWINGS

Illustration of the interrelationship of elements, function and advantages of the present invention are provided in the accompanying drawings, in which like references and corresponding reference numbers are identified within the ensuing detailed description. The drawings are intended to illustrate principles of the invention, and are not necessarily to scale.

DETAILED DESCRIPTION

An embodiment of the invention will be described with reference to use of the embodiment in connection with a passenger aircraft. However, it will be appreciated that many features of the invention are applicable to, and may be incorporated in, other mobile vehicles. As used herein, the term mobile vehicle includes a passenger aircraft, a military or commercial transport vehicle (including a cargo aircraft), and other media of transportation, including marine vessels (ships and boats). The illustrated embodiment includes scalable architecture permitting elements of the embodiment to be installed and utilized in smaller commercial or private aircraft. Additionally, the illustrated embodiment is intended to make maximum use of existing system on board the aircraft.

Individual and cumulative functional aspects of the present invention rely upon coordinated relationship between, 1. Airborne Element, 2. Wireless Communication Element, 3. Ground-Based Control Center, and 4. Air Traffic Control.

Abbreviations are utilized in the following manner:

Airborne element (AE) identifies integrated elements and sub-systems installed in the aircraft.

Global navigation satellite system (GNSS) in an inclusive reference to any global navigation systems including, but not limited to, GPS (global positioning system) and GLONASS (global orbiting navigation satellite system).

Satellite communication (SATCOM) is a broad inclusive reference to satellite communication link(s), equipment, constellations or mode of transmitting or receiving data by such means Flight data receiving center (FDRC) corresponds to a plurality of ground-based receiving centers operating ostensibly as one. Functions include concurrent biometric analysis, geo-positional surveillance, tracking, computer-based graphic display, flight recorder download control, aircraft alert code monitoring and response. FDRC locations are broadly spaced to assure comprehensive geographic coverage and communication. Individual FDRC locations are linked by satellite or fiberoptic link, enabling data to be shared between FDRC elements and Air Traffic Control (ATC).

Figure 1:
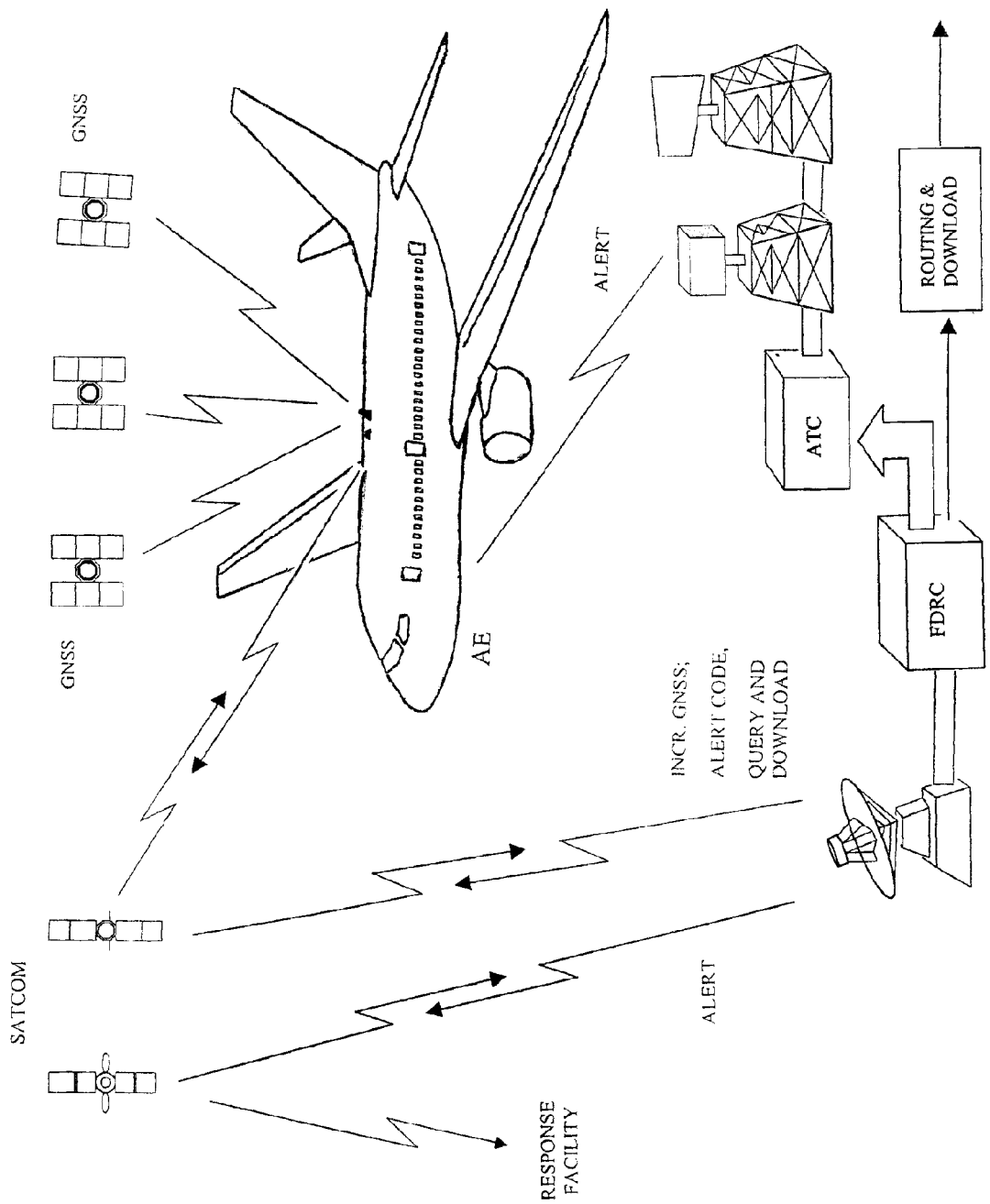
FIG. 1 illustrates the inclusive systems of an embodiment of the present invention, including primary and secondary elements and communication links connecting the functional aspects thereof.

FIG. 1 illustrates the interrelationship of primary elements and the corresponding forms of data or signals they generate or relay; including: GNSS (Satellites)—Transmit time indexed signal for geo-positional determination; AE—Receives and interprets GNSS signal, transmits incremental GNSS data to FDRC, transmits contingent alert code(s) to FDRC and ATC. Additionally, AE receives Query signal from FDRC, downloads flight recorder contents; FDRC—Processes and displays AE geo-positional data, processes and verifies Alert Codes, transmits Query commands to AE, receives flight recorder download; Routing & Download—refers to FDRC transfer of alert through hierarchy alert routing (FIG. 3A, 49) and transfer of download and data to end users (FIG. 3B, 77, 78, 86); SATCOM—provides communications link between elements, relays FDRC generated alert signal to response to nearest Search And Rescue teams (SAR) or response facilities; ATC Receives Mode-S transponder redundant alert code transmission from AE.

Systems and elements of the present invention enable transmission of specific alert codes, in response to contingent events detected by sub-system elements. These alert codes, include, but are not limited to: code 7500—detection of an unauthorized individual in the controlled space (flight deck); Code 7600—substantial deviation from course or heading; Code 7700—non-responding aircraft (no incremental positional transmissions); Code 7800—projected aircraft net terminal location (NTL).

Aircraft Surveillance, Tracking and Display

Figure 2:
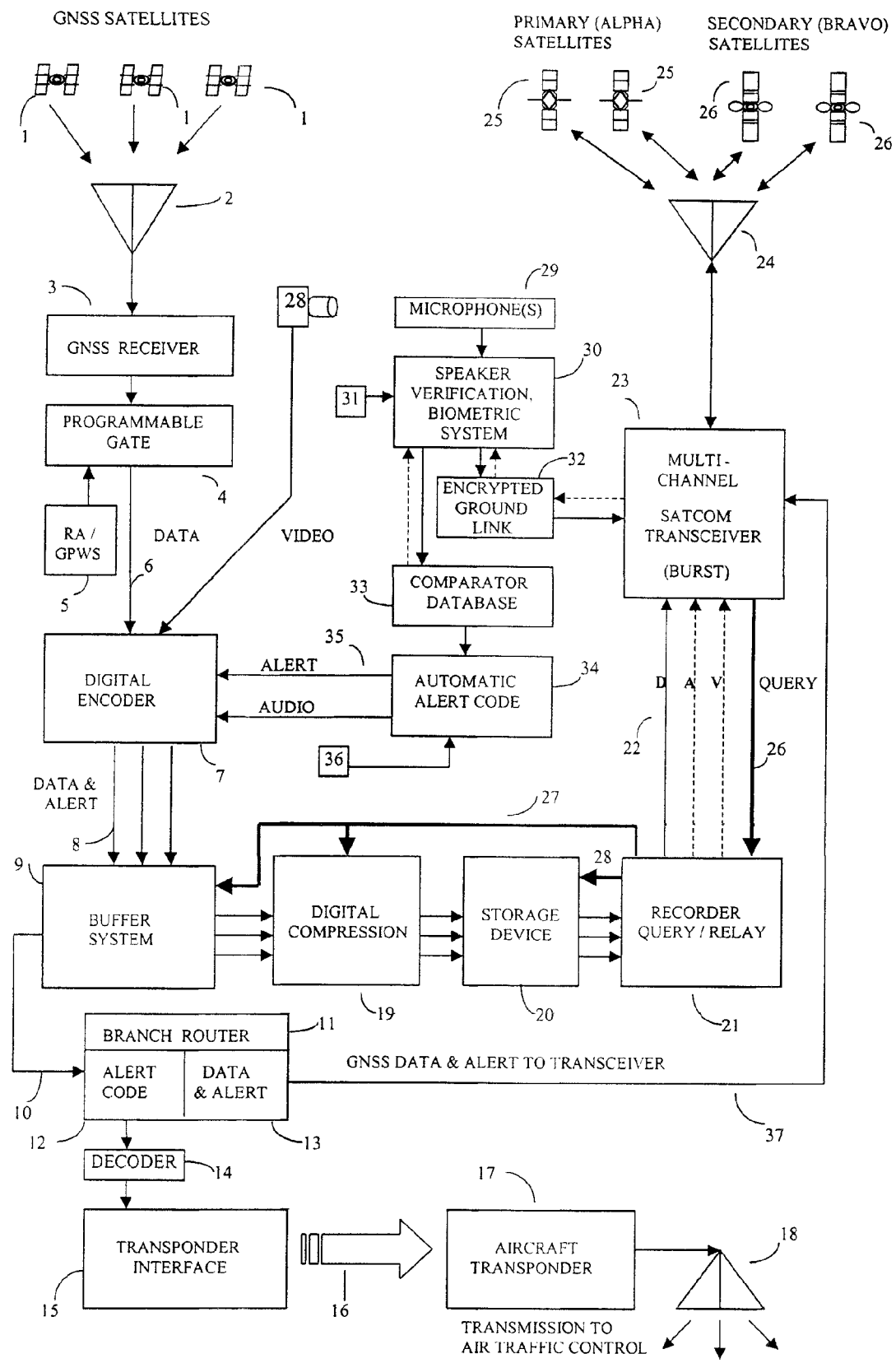
FIG. 2 is a block schematic drawing of the airborne element of the illustrated embodiment of present invention, detailing primary systems and sub-elements of the illustrated embodiment and inclusive wireless communication elements, FIGS. 3A and 3B, which may be collectively referred to as FIG. 3, is a block schematic diagram representing the flow and function of the ground based receiving center (Flight Data Receiving Center)

FIG. 2 depicts interrelated functions and sub-system elements of the AE. data collection, transfer and transmission constituents of the GNSS tracking sub-system are identified as follows; GNSS satellites 1, antenna 2 for receiving GPS/GLONASS or other positioning satellite signals, GNSS receiver 3, programmable gate 4, RA/GPWS (radar altimeter/ground position warning system) 5, and the multi-channel SatCom transceiver 23.

In the illustrated embodiment, GNSS receiver 3 is a separate receiver utilized to derive positional data of a moving or stationary body in which said receiver's location is calculated by acquiring geo-positional satellite signals through antenna 2, from GNSS satellites 1, sufficient to enable GNSS receiver 3 to calculate position in latitude, longitude and altitude.

Data produced by the GNSS receiver 3 includes time and positional coordinates and is regulated by the programmable gate 4, which sets incremental rate at which positional data is transferred to remaining elements and sub-elements of the AE. This incremental rate, or sample rate, corresponds to an established rate, such as a range of one sample every two to five minutes. Each incremental sample is precisely timed, and limited to one positional location. This timing is derived from the GNSS satellite signals, in the form of, or which is converted to, a universal time unit of chronological measure, such as Greenwich Mean Time (GMT, UTC) or equivalent. This time and derived or encoded date is paired with each incremental sampling of the GNSS receiver 3. AE system maintains a backup clock and power supply to assure continuity of operation.

Figure 3A:
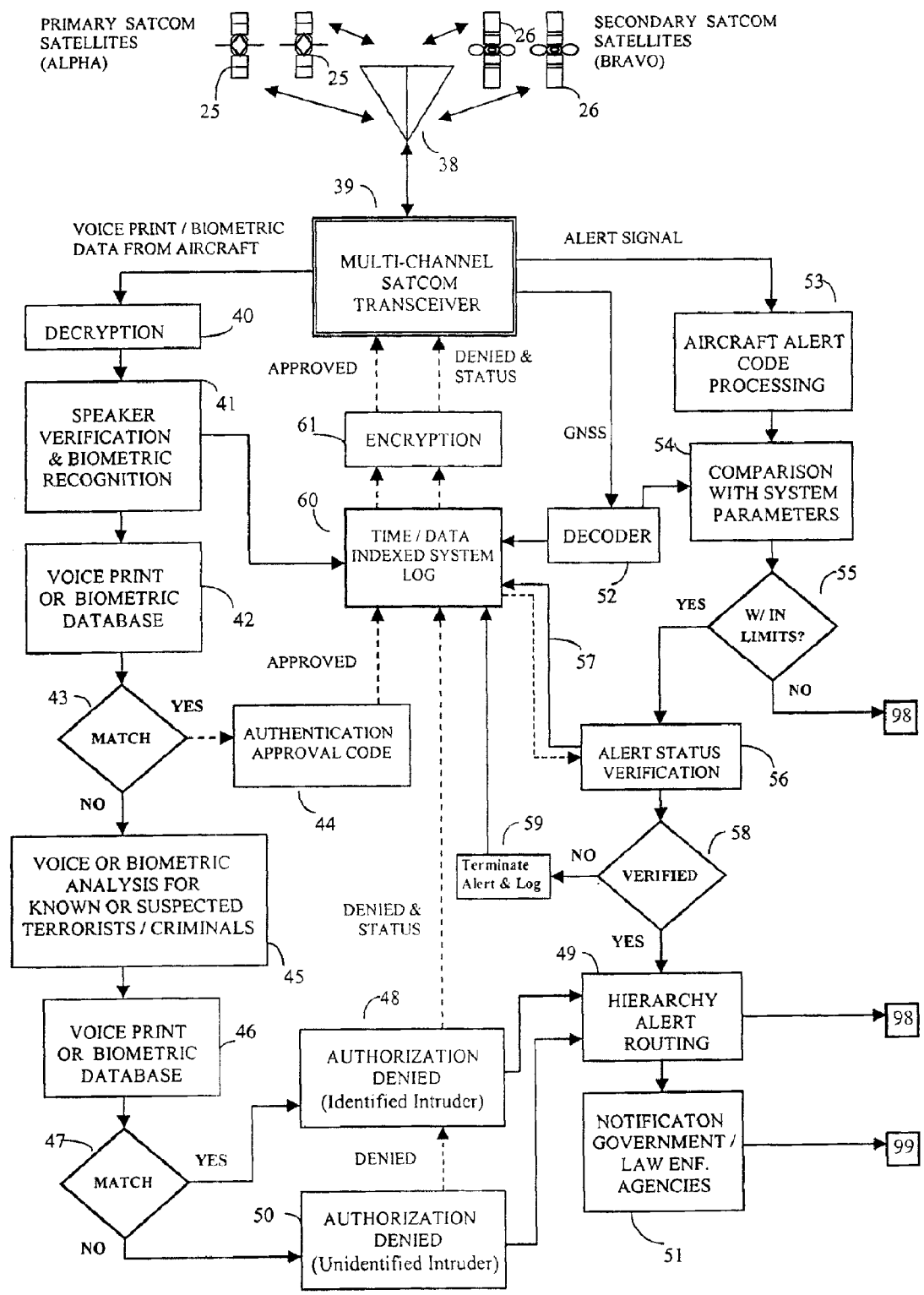
Figure 3B:
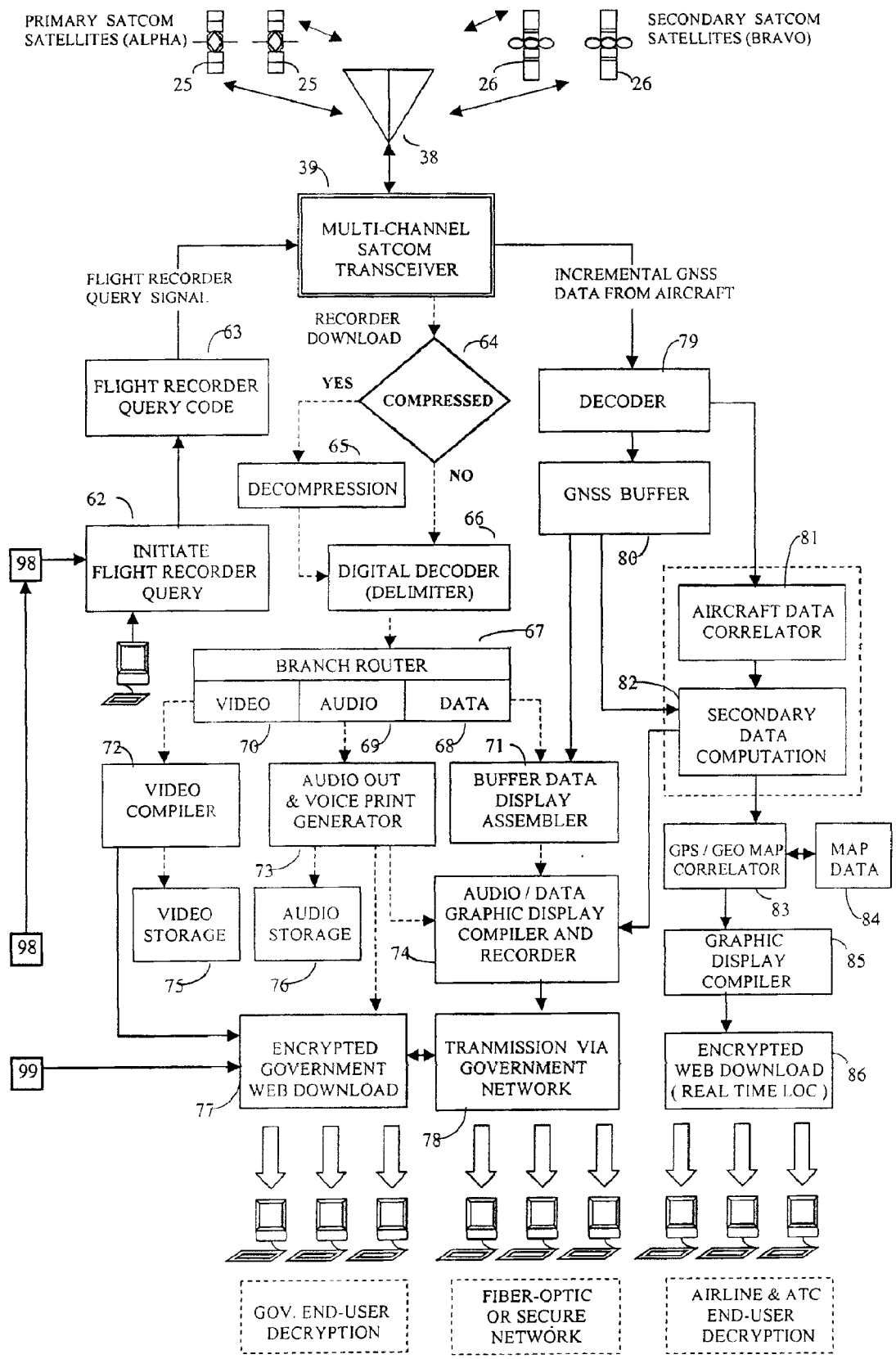
Figure 4A:
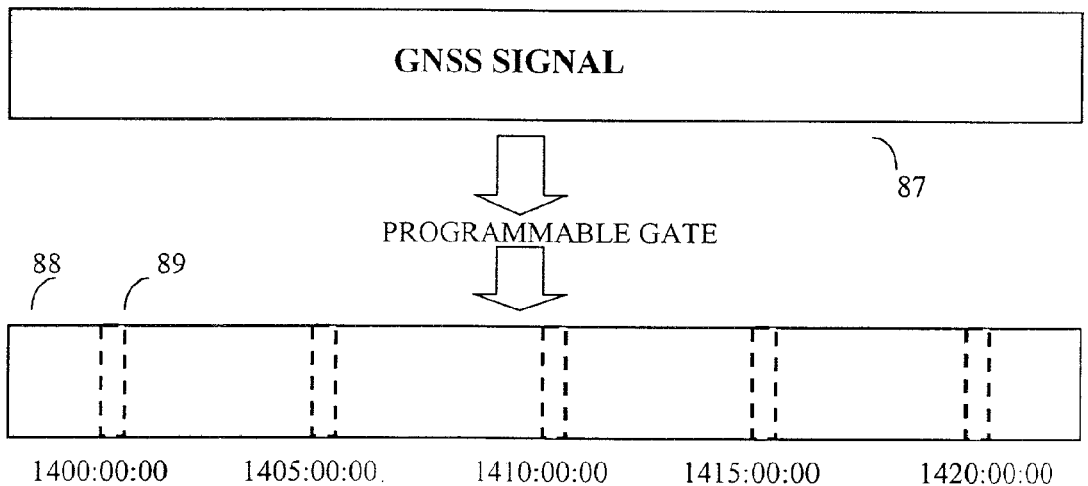
FIG. 4A illustrates the acquired GNSS positional signal and subsequent incremental sampling by the programmable gate, corresponding to singular geo-positional values per sample.

FIG. 4A illustrates the relationship between near-continual GNSS signal 87, as monitored by GNSS receiver (FIGS. 2, 3), and the subsequent processing by the programmable gate (FIGS. 2, 4) and the resulting incremental sample rate, as depicted in FIG. 4A, 88. The dashed-line segments demonstrate individual GNSS samples 89 and, by way of example, are labeled with military time in which each sample was taken i.e., 1400:00:00, 1405:00:00, 1410:00:00, etc. Each singular sample indicated by the corresponding vertical dashed line segment, contains date, time, latitude, longitude, altitude (ASL, and AGL if applicable).

Programmable gate 4 (FIGS. 2, 4) incorporates means of adjusting sample rate which governs GNSS data transfer to remaining elements of the sub-system. This sample rate is expressed as a number corresponding to the number of samples per hour. By way of illustration, a sample rate of once every five minutes equals an encoded sample rate of 12 samples per hour and a sample rate of once every 2 minutes equals an encoded sample rate of 30 samples per hour.

Certain features of the present invention rely upon a contingent automatic increase of the sample rate, in response to AE position in relationship to the ground. It is understood GNSS systems may provide altitude above sea level (ASL); however this is not sufficient to determine proximity to terrain. For this reason, radar altimeter or ground position warning system (RA/GPWS) 5 is employed.

In the preferred embodiment, the Radar Altimeter/Ground Positioning Warning System (RA/GPWS) 5 signals the programmable gate 4 when AGL is at or below the decision height (DH), prompting the programmable gate 4 to substantially increase sample rate, thus providing more rapid indication to the FDRC as to location. Additionally, it is the intent of the illustrated embodiment to derive accurate measurement of AGL from the RA/GPWS 5, at or below DH, and combine this data in a sequential linear timed transmission of data 6 to digital encoder 7, which delimits data by interspersing dividers or delimiters separating data into sets which may later be separated by FDRC into their original order and form. Although one of a number of delimiters may be selected, by way of illustration semi-colons (;) are used to distinguish between separate elements of data, and commas (,) are used to distinguish between related elements of data. The resulting delimited data produced by the digital encoder 7, include the following data elements:

Aircraft identifier; date, time; sample rate; latitude, longitude; altitude above sea level; altitude above ground level; alert code (if applicable).

The order in which the data elements are transmitted may be different from the order in which the elements are listed above.

Figure 4B:
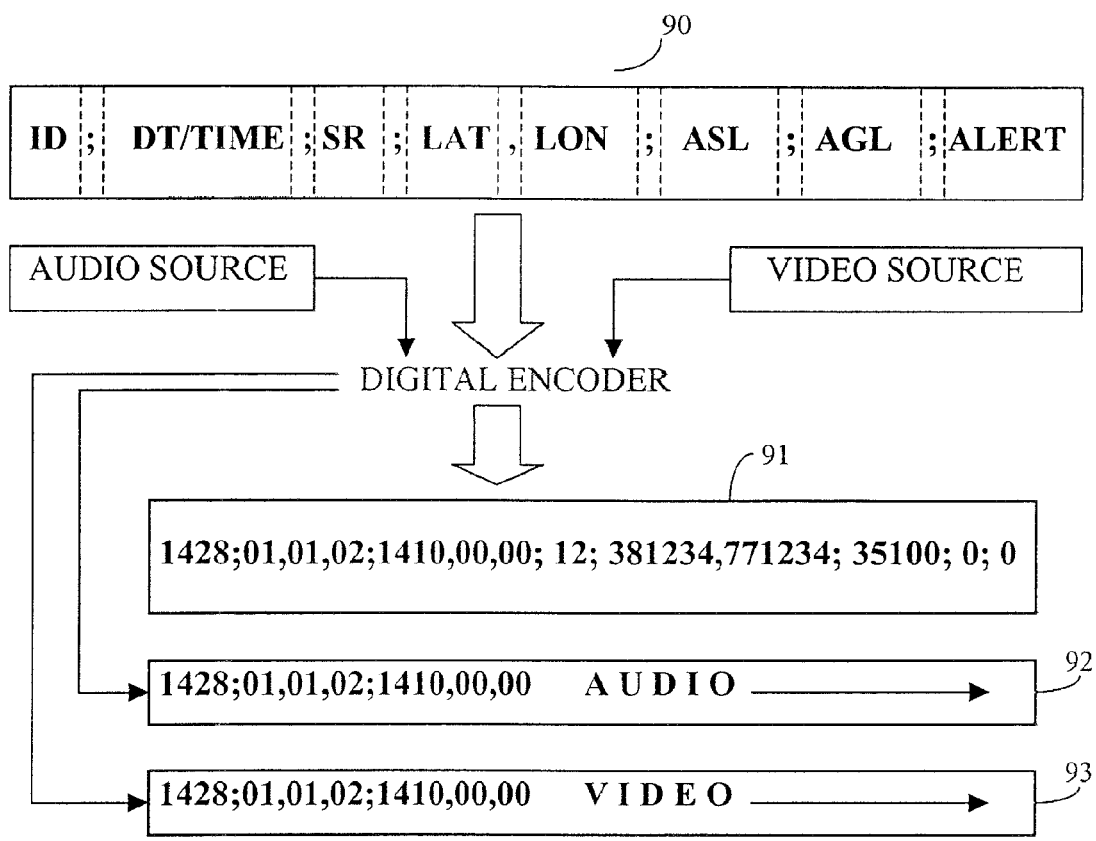
FIG. 4B illustrates varied forms of date/time-concurrently generated data which are subsequently delimited by the digital encoder and assembled into a linear sequential stream, demonstrates indexing of data to aircraft identifier, date and time, including separate channels of audio and video.

FIG. 4B demonstrates linear flow of separate indexed elements of data 90 to the digital encoder, along with separate channels of audio and video. The data elements identified in 90 are then delimited into a sequential pre-determined order, indexed by the corresponding date and time in which the sample or individual elements of data were obtained. An illustration of the resulting delimited data stream is demonstrated in 91. Audio and video 92, 93 are processed separately.

It is important to note that the delimiter is also capable of encrypting any or all elements of the data. This may be useful to eliminate chance of any adverse party receiving or interpreting portions of the transmitted data. Application of encryption capability and function is selected or defined at the discretion of the end user.

Certain contingent elements of data are not always present within the delimited data, such as AGL data. In the event RA/GPWS is above DH then the digital encoder records a zero in the space normally occupied by AGL data. This indicates no data is available, demonstrating the aircraft or commercial transport is above DH.

Once encoded, data is incrementally transferred to multi-channel SatCom transceiver 23 for immediate transmission at the set sample rate.

Resulting incremental GNSS signal is then transferred by SatCom communications link to FDRC (FIG. 3B), antenna 38, and multi-channel SatCom transceiver 39 to decoder 79. This block identifies and delineates data-related elements of the broadcast signal and removes delimiting markers separating various constituents of the data signal. All data, including positional coordinates, retain the corresponding aircraft identifier and date-time index markers contained within the original linear sequential assemblage of data. This permits constituent elements of data to be processed along separate data pathways, allowing the sum of those separate processing steps to be correlated for computation of secondary data and subsequent display of a graphic depiction of the position of the aircraft at the indexed date and time.

Positional data, including latitude, longitude and altitude (ASL, AGL) are subsequently transferred from decoder 79 to GNSS buffer 80 which maintains a reference of the most recent historical path of each indexed aircraft, up to a defined or programmed number of positional samples. The GNSS buffer 80 maintains a buffer record of aircraft-specific positional data up to and including the maximum sample indicated. Since all records are identified by date-time markers, individual indexed buffer records include altitude data (ASL, AGL) permitting an inclusive reference for calculation and display of incremental positional changes and tendencies which may be expressed on a three dimensional basis.

The above described latitude, longitude and altitude data is transferred from decoder 79 to aircraft data correlator 81, allowing calculation of secondary data including 1) compass heading, 2) distance traveled and 3) current speed. Calculation of secondary data is based upon relational basis between two or more incrementally transmitted positional coordinates (latitude/longitude), and the time interval separating those coordinates. Algorithms used to calculate elements of secondary data include but are not limited to the examples listed below:

Compass-leading Derived from Incremental Position Data

Because the most direct path between two points on earth follows a great circle, the following algorithm returns a compass heading when latitude and longitude coordinates are compared between two transmitted aircraft positions:

Definitions

LAT1, LON1—position of aircraft in degrees of latitude and longitude as determined by GNSS (GPS, GLONASS).

LAT2, LON2—secondary transmitted aircraft location in degrees latitude and longitude.

Mod—modulo operation. Returns remainder of division by argument, in this case 2*pi

PI=3.14159265

ATAN2—math function that returns arctangent of argument and quadrant of plane that angle belongs in.

HEAD=calculated heading from LAT1, LON1 to LAT2, LON2.

$$\text{Head}=\text{mod}(a\tan 2(\sin(\text{LON1}-\text{LON2})*\cos(\text{LAT2}),$$
$$\cos(\text{LAT1})\times\sin(\text{LAT2})-\sin(\text{LAT1})-\sin(\text{LAT2})$$
$$*\cos(\text{LON1}-\text{LON2})), 2*pi) \quad \text{Algorithm 1}$$

Distance, Derived from Incremental Position Data

Definitions

LAT1, LON1—position of aircraft in degrees of latitude and longitude as determined by GNSS (GPS, GLONASS) readings.

LAT2, LON2—secondary transmitted aircraft location in degrees latitude and longitude.

DLON=LON2−LON1 (this is simply the difference between two longitudes)

DLAT=LAT2−LAT1

ANG=angle in radians between the two points as referenced from the center of the earth.

A=temporary variable

RAD=radius of the earth–varies with latitude from 3418.97368 nautical miles (NM) at the poles to 3452.84210 NM at the equator ALT1=altitude in feet above sea level (ASL) from aircraft ALT2=altitude ASL computed in nautical miles DIST=nautical miles (NM) between two points $$\text{ALT2}=\text{ASL}/6080$$

$$\text{DLON}=\text{LON2}-\text{LON1}$$

$$\text{DLAT}=\text{LAT2}-\text{LAT1}$$

$$A=(\sin(\text{DLAT}/2))^2+\cos(\text{LAT1})*\cos(\text{LAT2})*(\sin(\text{DLON}/2))^2$$

$$\text{ANG}=2*a\tan 2(\text{sqrt}(a), \text{sqrt}(1-a))$$

$$\text{DIST}=(\text{RAD}+\text{ALT2})*\text{ANG} \quad \text{Algorithm 2}$$

Current Aircraft Speed Derived from Incremental Position Data

The formula below returns airspeed in percentage of Mach and may be adjusted to calculate speed in miles per hour, knots or other unit of measure.

Definitions

SR=sample rate corresponding to time interval between transmitted coordinates contained in data transmission from aircraft.

DIST=distance in nautical miles (NM=6080 feet). This is the product of the distance algorithm, discussed earlier.

MACH=622.65789 NM/hr.

% MACH=percentage of Mach $$\text{\% MACH}=(\text{DIST}*\text{SR})/622.65789$$

$$\text{KNOTS}=\text{DIST}*\text{SR} \quad \text{Algorithm 3}$$

Average Speed, Derived from GNSS Buffer Data

From the GNSS buffer 80, an accumulated record of sequential coordinates of the aircraft is obtained. Respective distances for each successive set of coordinates is calculated using the aforementioned distance algorithm and assigned corresponding identifiers DIST1, DIST2, DIST3, etc. By dividing the sum of DIST1, DIST2 and DIST3 by the number of distance values, an average is obtained. The resulting average is then multiplied by sample rate to return a value in knots, or divided by 622.65789 to obtain a value in AVG % MACH. The following algorithm may be applied to any number of derived positions.

$$\text{AVG \% MACH}=(\text{DIST1}+\text{DIST2}+\text{DIST3}/3)$$
$$*\text{SR}\div 622.65789$$

$$\text{AVG KNOTS}=\text{SR}*(\text{DIST1}+\text{DIST2}+\text{DIST3})/3 \quad \text{Algorithm 4}$$

GNSS Aircraft Tracking Display

FDRC (FIG. 33) processing of AE incrementally transmitted positional data includes sequential SatCom signal processing elements 38, 39, 79 and 80. Aircraft and flight-specific data is accessed and transferred from the aircraft data correlator 81 and combined with secondary data computation 82 for individual referenced aircraft.

Precise positional data provides means of identifying the geographical domain of an aircraft in relationship to a corresponding map display. Geographic juxtaposition and graphic display of an aircraft's dynamic position in relationship to terrain is based on the following; Each map has an inclusive range of latitude and longitude positions corresponding to its geographic bounds, or geographic domain. Map correlator 83 obtains current AE position, determines geographic domain in which the AE's current position is included and then calls up the corresponding base map from map data 84 interposing a graphic symbol corresponding to the aircraft's latitude and secondarily calculated course heading and speed. Historical path of a displayed aircraft may be displayed as a line or tail behind the aircraft's current geographic position. Sequential positions of an aircraft's historical path are indexed in GNSS buffer (FIG. 3B, 80), and may be useful in determining precise course and any applicable deviation.

Figure 9:
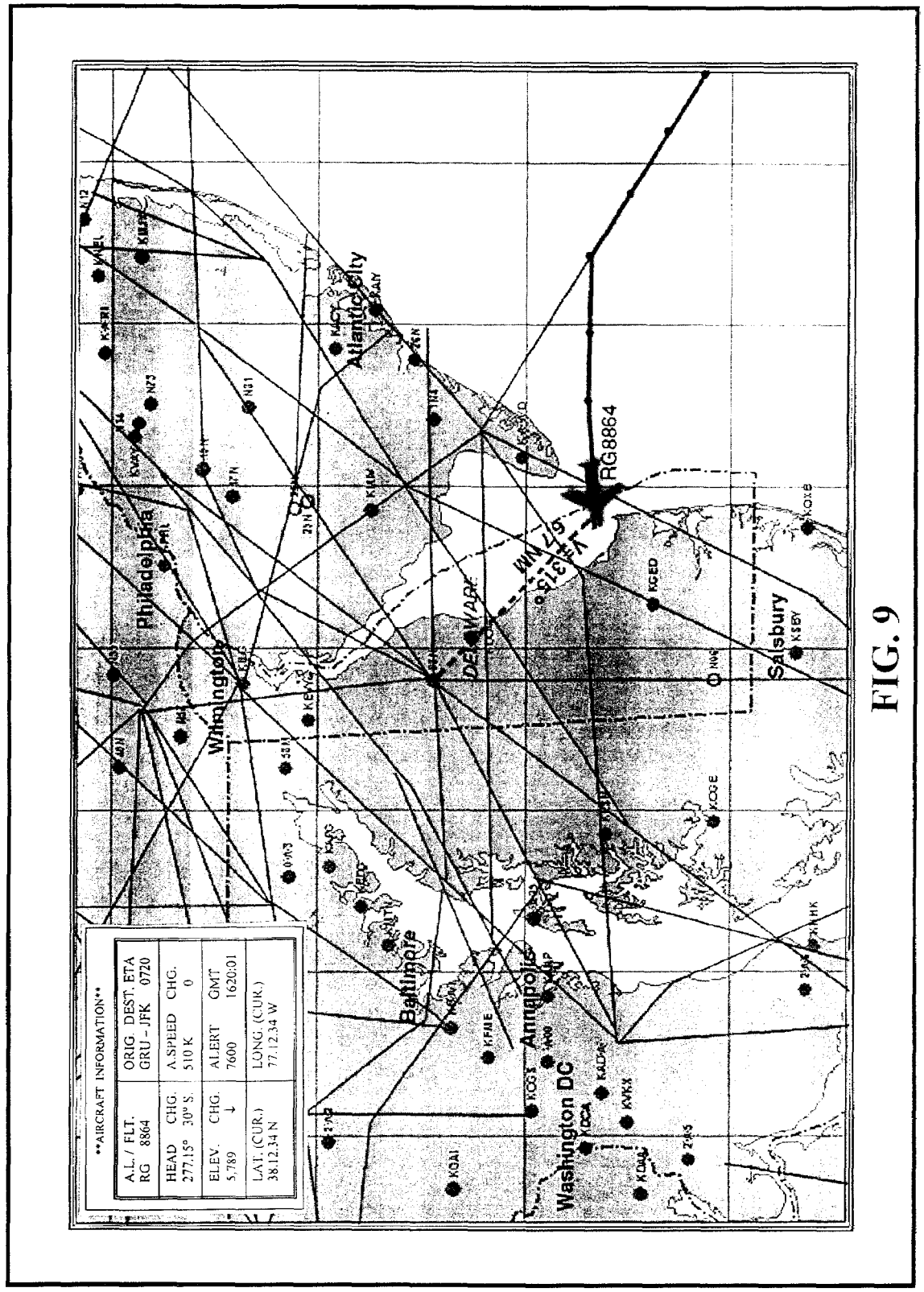
FIG. 9 is a graphic map display indicating the current dynamic positional aspect of an aircraft and its relationship to a correlated map corresponding to the geographic domain of the equipped aircraft, and displays additional aircraft-specific data and vector line aspects of the illustrated embodiment of the present invention.

FIG. 9 illustrates a correlated display, of the representative dynamic path of an aircraft's forward progression in relationship to its geographic surroundings. In this example, an aircraft, VARIG (RG Flight 8864 from Sao Paulo, Brazil (GRU airport code) to New York (JFK), is approaching the eastern seaboard below Atlantic City at 6:47 A.M.

Display of the aircraft's historical path is demonstrated in FIG. 9 by a line or tail behind the aircraft, showing its prior transmitted positional coordinates. This provides very precise means of identifying an aircraft's current relationship to geographic identifiers as well as calling attention to positional changes and substantial deviations over time. Some current surveillance methods correlate positional data in relationship to aircraft transmitted course intent, or ATC displayed navigational lines, but fail to adequately identify precise path of travel of a given aircraft totally independent of anticipated navigational lines or parameters. Referenced maps and inclusion of certain graphic elements are available as individual layers permitting user selectable features to be displayed or omitted. These layers include, but are not limited to, cities; transportation routes and highways; primary and secondary airports; high-low aircraft navigational lines; controlled spaces; governmental buildings and landmarks; military or coast guard bases; search & rescue facilities.

Aircraft within a given geographic domain may be displayed singly, as need dictates, or a display may be called up to depict all aircraft within a given airspace or region, or to display all aircraft corresponding to a particular airline or entity. Additional data may be displayed Automatic Vector Line and Display Vector line aspect of the illustrated embodiment provides a selectable means of calculating and displaying one or more lines from the dynamically advancing position of the displayed aircraft to the nearest primary and/or alternate airport(s). Stored latitude and longitude data of the fixed location of these airports permit comparison and calculation of positional differences between the dynamic path of the aircraft and the stored reference coordinates. FDRC system first determines nearest viable airport relative to the aircraft, displaying a vector line and calculated compass heading and nautical miles from the aircraft to the fixed point position of the selected airport.

FIG. 9 provides an example of the graphic display of the automatic vector line. In this example, VARIG Airlines (RG) encounters problems and deviates from its course by 30 degrees south. Automatic calculation of the vector line indicates an alternate airport northwest of Dover, Del., where this aircraft may land. The vector line display includes compass heading of 315 degrees, with corresponding distance of 6.7 nautical miles. The vector line in this example is displayed as a dashed-line, and is continually recalculated in relationship to the aircraft's dynamic change of position.

Calculation of compass heading from aircraft to fixed point location is identical to the compass heading algorithm (previously described).

Distance calculation between the aircraft and the fixed point location is calculated using a Haversine algorithm enabling data to be computed in nautical miles.

Definitions

LAT1, LON1—position of aircraft in degrees latitude and longitude as determined by GPS readings.

LAT2, LON2—position of fixed point location in degrees latitude and longitude as determined from data base.

DLON=LON2−LON1

DLAT=LAT2−LAT 1

ANG=is the angle in radians between the two points as referenced from the center of the earth.

A=temporary variable

RAD=radius of the Earth. Varies between 3418.97368 NM at the poles to 3452.8421 NM at the equator.

DIST=nautical miles (NM) between two points Algorithm

DLON=LON2−LON1

DLAT=LAT1−LAT2

$A=(\sin(DLAT/2))^2+\cos(LAT1)*\cos(LAT2*(\sin(DLON/2))^2$ $ANG=2*a\tan2(\sqrt{a}, \sqrt{1-a})$ DIST=RAD*ANG  Algorithm Aircraft surveillance and tracking aspect of the illustrated embodiment differs from competing systems in the following manner: ADS and FANS may primarily rely upon transmission of aircraft position in relationship to stated course intent or existing navigational lines, and therefore a lesser degree of accuracy with extreme deviation from course-heading or navigational lines as indicated in the catastrophic events Sep. 11, 2001. Additionally, ADS, ADS-B, FANS and other systems transmit coordinates including latitude, longitude, airspeed, course heading and (course) intent. The illustrated embodiment of the present invention permits the FDFC to accurately calculate secondary data from primary data transmitted by AE. This secondary data includes compass heading, distance, current speed, average speed and any deviation from incremental transmission of latitude, longitude and altitude.

FIG. 9 provides an example of a CRT display screen and indicates precise location of an aircraft in relationship to its geographic surroundings. Terrain, cities and waterways are identified, as well as aircraft navigational lines. Although existing ATC system displays indicate an aircraft's location in relationship to high-low navigational lines, the illustrated embodiment of the present invention provides an accurate means of correlating an aircraft's precise position in relationship to geographical identifiers.

FIG. 9 likewise depicts the historical path of the displayed aircraft, appearing as a line or tail behind the aircraft. The incremental dots on this line are offered for illustration purposes, indicating sequential positions corresponding to the aircraft's successive transmitted positions. The distances between these dots are strictly for purposes of illustration.

FIG. 9 also provides visual representation of a vector-line display, indicating automatic display of course heading and distance from an aircraft to the nearest viable primary or secondary airport. This feature is selectable.

Common Alert Code Communication Elements

Multi-path communication redundancy aspect of the AE (FIG. 2) decreases risk of system compromise while increasing means of immediate communication of aircraft-specific alerts to FDRC and ATC. Primary communication is initiated through inclusive SatCom communication elements, including two or more satellite constellations sufficient for global coverage, depending upon the coverage of each respective constellation. In FIG. 2, this is illustrated by primary (alpha) satellites 25 and secondary (bravo) satellites 26. Transmission of AE alert codes, in this manner, are directed to the FDRC.

Secondary means of transmission of alert signals are initiated through inclusive transponder communication elements of the AE, with ATC as the resulting signal destination.

Elements of each of the respective parallel communication systems are as follows:

SATCOM communication elements relative to GNSS positional data and alert signals include alert 35, to digital encoder 7, where the alert signal is delimited, then data & alert 8 through buffer system 9 and data path 10, to branch router 11, data & alert 13 channel, and GNSS & alert to transceiver 37 datapath, to multi-channel Satcom transceiver 23, antenna 24 and Satcom satellites 25 and/or 26;

Transponder elements and data paths of the AE include alert 35, is delimited in digital encoder 7, then passed through data & alert 8 through buffer system 9 and data path 10 to branch router 11, alert code 12 channel, to decoder 14 and transponder interface 15, approved system connector represented by arrow 16, to aircraft transponder 17, antenna 18 with resulting RF transmission to ATC receiving center(s).

Alert codes are either initiated AE or FDRC elements, with the latter of these responding to conditional changes or absence of the incrementally transmitted AE positional coordinates. The differences are described below:

Automatic Alert Code Generation

In the context of the illustrated embodiment, delineation of the parameters and contingent aspects of alert codes are noted as follows:

Code 7500 is relative to AE detected intrusion within the cockpit or other controlled space, including detection of unrecognized biometric characteristics within the controlled space. Detailed discussion of the contingent aspects of this alert code are contained within the section pertaining to biometric monitoring.

Code 7600 pertains to AE (FIG. 2) detected deviation from course or navigational parameters, which exceed programmed or established threshold values contained within reference storage device 36. These threshold values may contain alteration of course heading beyond a set degree value, or it may signal a Code 7600 alert if the aircraft approaches or attempts to intrude upon certain controlled space, such as those around national landmarks or military installations.

Code 7700 references FDRC detected absence of incremental positional transmission by an aircraft (AE). FDRC (FIG. 3A) monitors incremental GNSS transmissions of each indexed operational aircraft. Signals received by multi-channel Satcom transceiver 39, are transferred to decoder 52 and time/data indexed system log 60. Comparison with system parameters 54, monitors the incremental GNSS transmissions, and determines any lapse of transmissions. If this occurs, verification is sought through 55, 56, 57, 60, 58. If this verification process fails to confirm Code 7700, the decision diamond transfers signal to terminate alert & log 59. If the signal is confirmed, an automatic download of the particular AE flight recorder is initiated through [98], with corresponding FIG. 3B links 62, 63, 39, 38 and 25 and/or 26. Concurrently if AE alert (FIG. 3A) is confirmed, hierarchy alert routing 49 transfers the Code 7700 alert to notification government/law enf. agencies 51, with link [99] to FIG. 3B, numbers 77 and 78.

Code 7800 permits advance transmission of an alert, upon AE determination of inevitability of controlled or uncontrolled flight into terrain. This alert code corresponds to projected net terminal location (NTL).

Operation is as follows:

Referring to FIG. 2, upon dropping below decision height (DH) set by radar altimeter/ground proximity warning system 5, RA/GPWS 5 signals the programmable gate 4 to substantially increase sample rate of the GNSS receiver 3.

Figure 11:
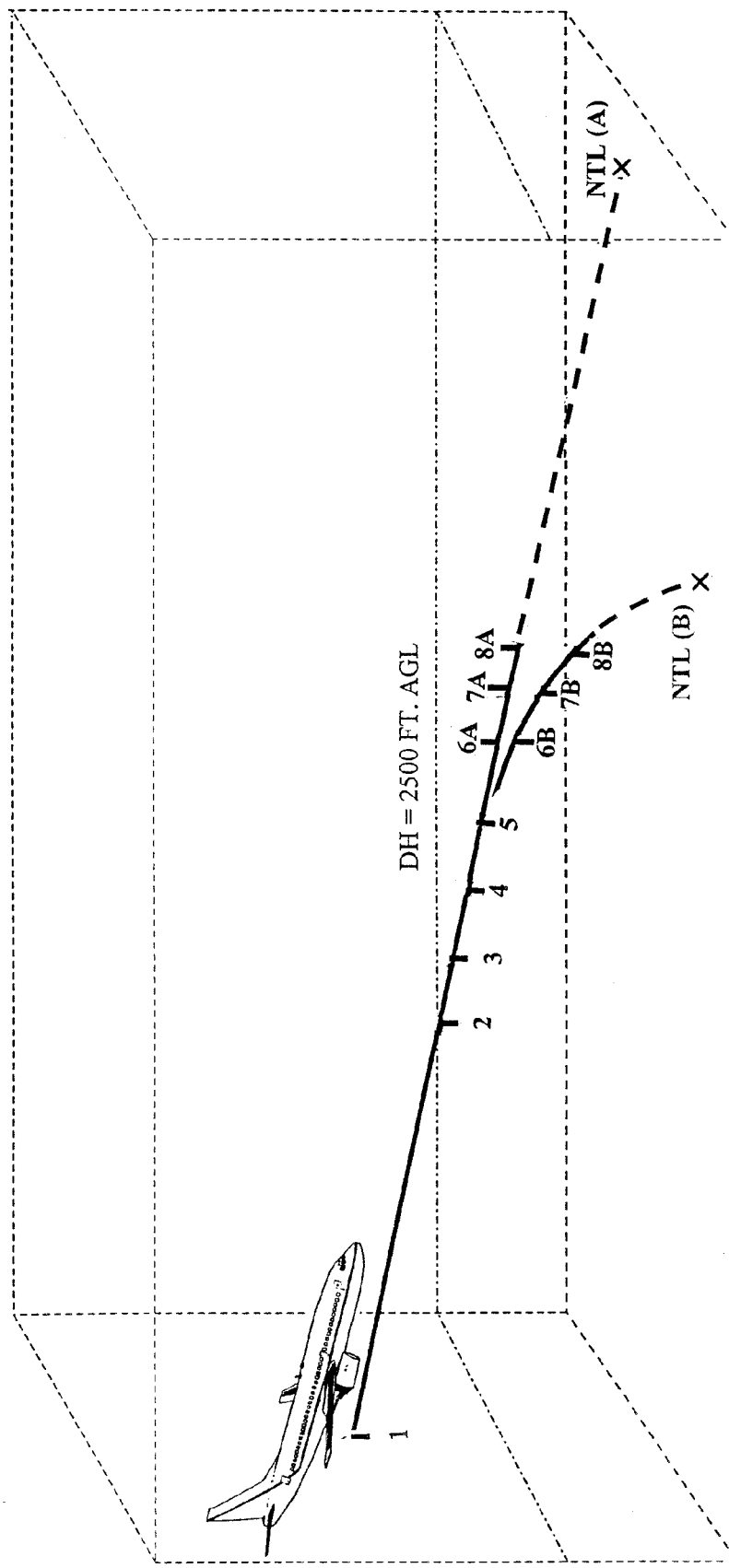
FIG. 11 is a graphic illustration of the descent of an aircraft above and below decision height (DH) set by radar altimeter/ground proximity warning system and corresponding change to sample rate regulated by the programmable gate, and illustrates calculation of NTL from the last transmitted positional coordinates.

FIG. 11. illustrates the descent of an aircraft, approaching DH (usually about 2,500 ft. AGL). Above DH, the incremental separation between samples established by the programmable gate (FIGS. 2, 4) is much greater, representing a longer corresponding distance traveled by the aircraft between each incremental transmission. This longer duration is depicted in the distance separating (FIG. 11) 1 and 2. An increase in SR below DH is illustrated in this Figure by successive numbers, 2, 3, 4, and 5. The increase of SR by the AE (FIG. 2), coupled with existing ASL altitude and RA/GPWS 5 derived AGL altitude, provides more frequent data from which the aircraft's glide path and trajectory may be determined on a three-dimensional basis, in relationship to the terrain below.

Automatic alert code block 34 examines operational parameters stored in a system addressable database 36, determining if projected glide path or course will result in an imminent controlled or uncontrolled flight into terrain. Determination is made by comparing aircraft's decreasing altitude or path against established parameters stored in reference database 36. If the comparison determines an imminent event, then an automatic alert code 34 (Code 7800) is initiated and transmitted to the FDRC through the SatCom communications link.

Referring to FIGS. 3A and 3B, upon FDRC receiving alert code, verification process is completed in a fraction of a second. Aircraft alert code processing 53 interprets the alert code and passes it to comparison with system parameters block 54, which analyzes origination of the alert in relationship to stored parameters. The decision diamond 55 returns a NO if the alert code is determined to be valid. This connects (through link [98]) to initiate flight recorder query 62 and transmission of query code 63 through the SatCom link back to the AE. This initiates immediate download and transmission of compressed audio and data portions of the flight recorder in compressed LIFO (Last In First Out) from AE back to the FDRC.

FDRC alert code confirmation initiates parallel processes through GNSS buffer 80, aircraft data correlator 81 and secondary data computation 82 to ascertain net terminal location of the aircraft, generate an automatic reverse vector line display, and notify the nearest search and rescue (SAR) teams or response facilities.

Automatic Reverse Vector Line Display

Rescue and recovery operations have been severely hampered by inability of present technology to identify location of a known or assumed aircraft crash site. Radar and other systems provide approximation of an aircraft's location based upon time and distance relationship of reflected or transmitted signal from the aircraft. From this, approximations may be made that are less accurate if aircraft deviates from a given navigational course or is outside the range of coverage.

One event illustrating this problem: on Jan. 31, 2000, Alaska Airlines Flight 261 to Seattle crashed off the coast of Northern California, 10 miles from Port Huenembe. Despite duration the plane was airborne prior to the crash, and close proximity of crash site to the shore, considerable time was taken to locate the crash site.

The illustrated embodiment of the present invention provides a more precise means of tracking and displaying an aircraft's geographic position in relationship to terrain or oceanic localities. Additionally, the preferred embodiment provides means of determining location of a crash site or net terminal location (NTL), precisely plotting a vector line from the nearest airport or response facility back to the aircraft, and displaying latitude, longitude, compass heading and nautical miles from that airport back to projected NTL of the aircraft, and automatic notification of the appropriate response facilities, which will typically be search and rescue teams nearest the NTL. This permits rapid deployment of search and rescue teams, greatly enhancing rescue efforts and assisting in recovery of the aircraft for later reconstruction of events leading to the event.

Operation is as follows:

Referring to FIG. 2, upon dropping below decision height (DH) set by the radar altimeter/ground proximity warning system 5, RA/GPWS 5 signals the programmable gate 4 to substantially increase sample rate of GNSS receiver 3, and correspondingly the transmitted positional data back to the FDRC.

FIG. 11. illustrates the descent of an aircraft, approaching DH (usually about 2,500 ft. AGL). Above DH, the incremental separation between SR established by the programmable gate (FIGS. 2, 4) is much greater, representing a longer corresponding distance traveled by the aircraft between successive incremental transmissions. This longer duration is depicted in the distance separating (FIG. 11) 1 and 2. An increase in SR below DH is illustrated in this FIG. 11 by successive numbers 2, 3, 4, and 5. The increase of SR by the AE (FIG. 2), coupled with existing ASL altitude and RA/GPWS 5 derived AGL altitude, provides more frequent data from which the aircraft's glide path and trajectory may be determined on a three-dimensional basis, in relationship to the terrain below.

(FIG. 2) Automatic alert code 34 block examines operational parameters stored in a system addressable data base 36, determining if projected glide path or course will result in an imminent controlled or uncontrolled flight into terrain. Determination is made by comparing aircraft's decreasing altitude or path against established parameters stored in reference data base 36. If comparison determines an imminent event, then an automatic alert code 34 is initiated and transmitted to the FDRC through the SatCom communications link.

Code 7800 (NTL) may also be generated by the FDRC in response to absence of an expected incremental signal from the aircraft. The FDRC determines whether the last reported coordinates (LRC) specify an AGL below DH and, if so, analyzes airspeed, glidepath and proximity to terrain to determine whether the aircraft may have been subject to a controlled or uncontrolled flight into terrain. I this manner the FDRC is able to detect an NTL event that has been missed by the AE.

Referring to FIGS. 3A and 3B, upon FDRC receiving alert code, verification process is completed in a fraction of a second. Aircraft alert code processing 53 interprets the alert code and passes it to comparison with system parameters block 54, which analyzes origination of the alert in relationship to stored parameters. The decision diamond 55 returns a NO if the alert code is determined to be valid. This connects (through link [98]) to initiate flight recorder query 62 and transmission of query code 63 through the SatCom link back to the AE. This initiates immediate download and transmission of compressed audio and data portions of the flight recorder in compressed LIFO from AE back to the FDRC.

FDRC alert code confirmation initiates parallel processes through GNSS buffer 80, aircraft data correlator 81 and secondary data computation 82 to ascertain net terminal location of the aircraft, generate an automatic reverse vector line display, and notify the nearest airport or rescue facility.

The data channel 68 of the branch router 67, passes current alert code and positional data to buffer data display assembler 71 and calls up historical data on the incremental path of the aircraft from GNSS buffer 80. It also transfers aircraft-specific data from aircraft data correlator 81 and GNSS buffer 80, data to secondary data computation 82 where calculations determine relational nature of last known latitude, longitude, altitude, airspeed and glide path of the aircraft.

The corresponding relationship of velocity (airspeed) and time are utilized in relationship to the aircraft's last reported AGL and geo-coordinates. The velocity and time are utilized to determine feet-per-second travel in relationship to calculated angle and glide path. The resulting intersection of glide path and terrain determines the aircraft a projected NTL. From this, a new latitude and longitude is calculated (NTL).

Secondary data computation 82 identifies the fixed latitude and longitude point of the nearest airport or response facility. Calculation of distance separating aircraft NTL from that fixed point location is completed by using the previously disclosed distance algorithm which calculates distance in nautical miles between the two points.

Compass heading is determined by previously referenced algorithm, from which 180 degrees is subtracted from HEAD (heading). This returns a value equal to the reverse heading from airport to NTL (in degrees).

GEO map correlator 83 then determines geographic domain of the NTL and retrieves the identified map from map data 84. Graphic display compiler 85 combines aircraft icon and map and generates a reverse vector line, graphically displaying a line from the nearest airport or response facility back to the aircraft's NTL.

Figure 10:
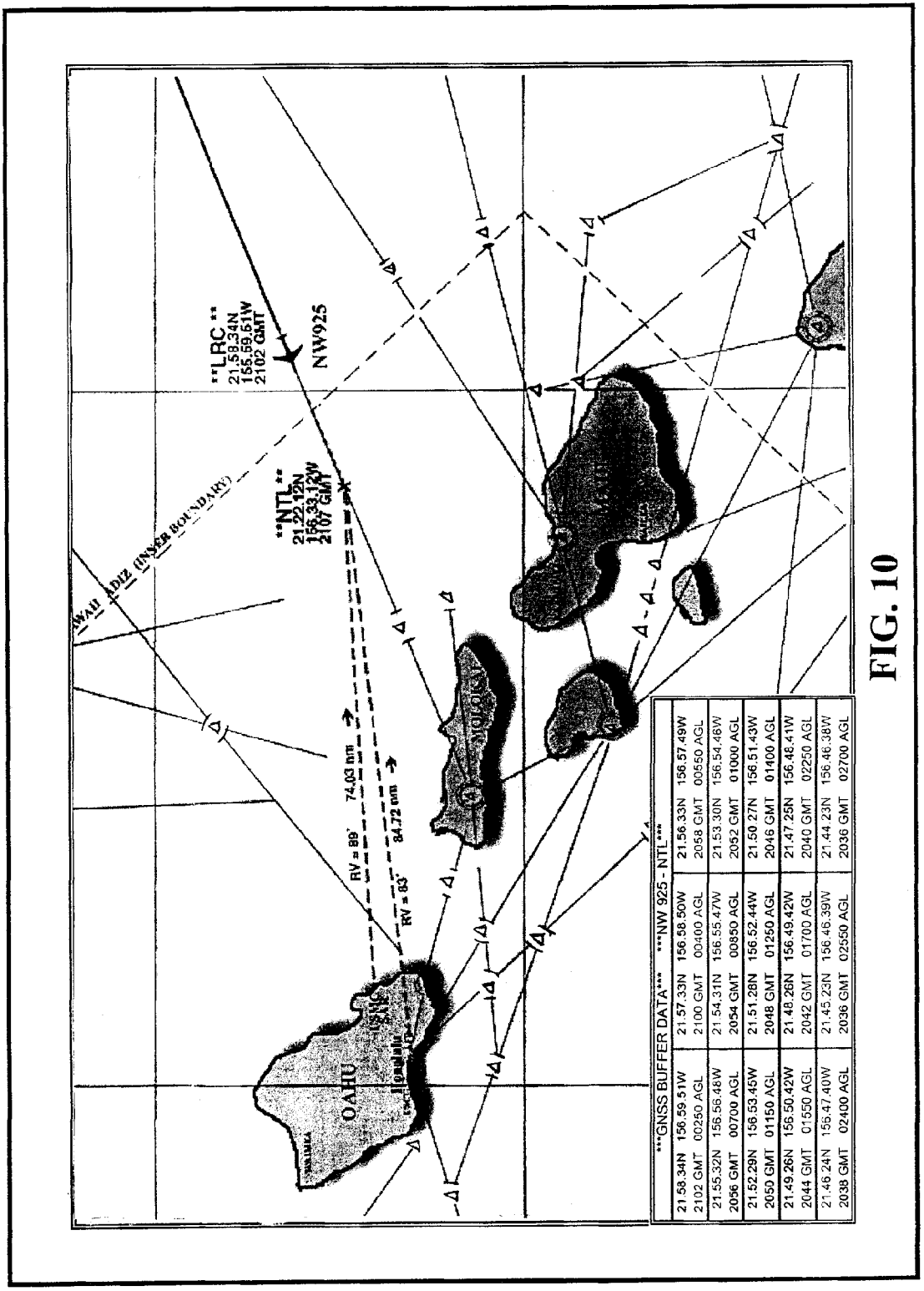
FIG. 10 is a graphic map display illustrating calculation and display of net terminal location (NTL) and reverse automatic reverse vector-line.

FIG. 10 presents an example of a CRT screen graphically displaying projected net terminal location of an aircraft near Hawaii, with reverse vector line from the nearest search and rescue team or response facility back to the aircraft. This CRT screen illustrates detailed data incorporated into the display, which facilitate rapid and precise location of an aircraft by responding personnel. This data includes latitude, longitude and altitude of the net terminal location, nautical miles and compass heading in degrees.

In the preferred embodiment, the display generated aircraft icon, incremental coordinates (historical path) and net terminal location of the aircraft are caused to flash, to alert air traffic control of the incident. Display of the composite map is communicated through encrypted web download 86 to Airline & ATC End-User where the image is automatically decrypted. Similar automatic notification is provided to the identified airport or response facility nearest the net terminal location of the aircraft.

Biometric Control Sub-System

The illustrated embodiment of the present invention employs a system and means for consistent analysis of intrinsic biometric features of a person seeking admission to a flight deck or other controlled space of the aircraft, while protecting against system compromise.

Within the context of the preferred embodiment, a means is identified in which concurrent biometric analysis is conducted between two parallel systems, substantially reducing risk of error, while protecting against system compromise of either biometric system element.

The sequential or non-sequential processes, functions and tasks of the biometric control sub-system may comprise elements of hardware, software or any combination thereof.

In the preferred embodiment, speaker verification is indicated as the selected means of biometric authentication. The term speaker verification identifies analysis of intrinsic characteristics of an individual against a stored record of a known person's speech, including but not limited to feature extraction method of text-independent speaker verification.

Additionally, the preferred embodiment utilizes text-dependent aspect of speaker verification for initial data index record retrieval and text-independent aspect for authentication of certain elements of the log-on's verbal utterances of non-conforming words and phrases against a reference database of extracted characteristics of a known-individual's speech.

Certain text-independent speaker verification systems employ pass-sequence randomization with audible or textual prompt to enunciate precise biometric system selected words and numbers for authentication of the person seeking admission to, or permission to operate within, the controlled area. This random selection of words and numbers, which comprise a log-on sequence, protects against system compromise by a tape recorded voice. Emerging technology methods enable delineating acoustic produced human utterances from digital or mechanically reproductions, thus adding additional assurance against system compromise.

Competing biometric technologies, such as thumb-print identification or iris scan systems are subject to compromise by an intruder removing corresponding portions of an authorized person's anatomy in relationship to that competing biometric method. Speaker verification is not prone to such compromise, since acoustic speech may not be separated from an authorized person. Additionally, the preferred embodiment of the present invention employs voice-stress analysis to indicate if a person's responses are under duress. This as accomplished through frequency-shift analysis which detects a consistent shift of speech to higher frequencies if a person is under induced stress.

Referring to FIG. 2, components of the biometric security and monitoring system include at least one microphone 29 located within the vicinity of flight deck or space for which access control is sought. In the preferred embodiment, several microphones are placed around the flight deck or controlled space, sufficient to detect any acoustic or other sounds within the controlled space. Use of existing headset microphones permits personnel to sequentially log onto the biometric system without passengers or crew overhearing details of the biometric security process.

The speaker verification biometric system 30 represents the central CPU element of the speaker verification system. Functional aspects of this block include initiation of log-on sequence, issuance of log-on prompts, and analysis of verbal responses to the authentication process.

Personnel submit to the authentication process in sequential order. Within the preferred embodiment, the highest ranking officer or employee would state into the microphone or headset, "LOG-ON". The CPU of the speaker verification biometric system 30 would then initiate an encrypted ground link 32 through the inclusive elements of the SatCom link to the FDRC. Once connected, parallel AE and FDPC biometric system elements concurrently analyze and process verbal responses to specific AE initiated prompts.

Speaker verification biometric system 30 then responds and prompts the enrolling officer or employee, "STATE NAME" the responding individual would then state his/her rank or position title and name, such as: "Captain, John R. Michaels."

Parallel AE and FDRC processing of verbalized (spoken) text-dependent rank/position and name is used as a data index for retrieval of corresponding memory elements in FIG. 2, 33 and FIG. 3A, 42, where known voice characteristics are stored corresponding to that individual.

Speaker verification biometric system 30 and comparator database 33 process verbal response of the officer/employee's rank/position and name log-on against stored voice characteristics of the same verbal sequence, corresponding to the known authorized individual. Concurrently, FDRC (FIG. 3A) speaker verification and biometric recognition 41, voice print or biometric database 42 and decision diamond 43, process the verbal response in corresponding fashion. Both AE and FDRC processes are parallel and concurrent, yet independent in their comparison of verbal sequences against their respective known databases.

Comparison occurs in a fraction of a second. Concurring approval by AE and FDRC regarding authenticity of log-on verbal sequence queues the AE system to generate and prompt the enrolling Officer or employee to recite AE selected random sequence of words and numbers, as in the example below:

"Repeat in sequence: Zulu, Azimuth, Bogie, Fife, Indigo, Thirty three"

with verbal response:

"Zulu, Azimuth, Bogie, Fife, Indigo, Thirty three"

Parallel AE (FIG. 2, numbers 30, 33) and FDRC (FIG. 3A, numbers 41, 42, 43) then process and compare extracted elements of speech (text-independent basis) with the previously referenced speech characteristics of the known-authorized individual.

Authentication of any officer/employee seeking access to the flight deck or other controlled space is contingent upon concurring approval by AE and FDRC parallel biometric systems. A concurring approval is called a Double-Go.

If either the AE or FDRC fails to authenticate an individual (Go and No-Go) then authentication is denied. As long as one system authenticates, then speaker verification biometric system FIG. 2, 30, immediately generates a second prompt with a different log-on sequence. The officer/employee's confirming log-on, is sufficient to clear any remote possibility of conflicting elements of extracted speech producing false-rejection from the initial speaker verification log-on.

If AE and FDRC biometric elements concur on authenticity of the log-on verbal sequence, then approval is indicated by audible tone through the headset or system speaker, and the next officer/employee states "LOG-ON" into their headset or microphone, and the previously described process is repeated. All officers/employees seeking authorization for the flight deck or other controlled space must receive confirmation prior to take-off or other initiated event for which clearance is sought.

Upon concurrent AE and FDRC approval of all flight crew or personnel operating within a given controlled space, all biometric system changes are locked-out, indicating that no changes are permitted to the logged record of authorized personnel until the aircraft reaches its final destination. This lock-out serves as basis for the biometric monitoring sub-system element of the present invention.

Indexed record of the approved personnel is maintained in secured temporary memory of the AE (FIG. 2) speaker verification biometric system 30, as well as logged in FDRC (FIG. 3A) time/data indexed system log 60. AE record is used to exclude non-authorized personnel from the controlled space and provide basis for reference by biometric Monitoring sub-system.

If, however, both AE and FDRC decline authorization of an officer/employee, then AE (FIG. 2) automatic alert code 34 is generated (Code 7500) and is forwarded by SatCom link to FDRC where automatic verification is initiated of log-on and alert code process (FIG. 3A numbers 53, 54, 55, 56, 57, 58, 59, 60). If this verification process indicates an error, the automatic alert is immediately cancelled. If, however, the alert is confirmed then hierarchy alert routing 49 identifies and initiates contact with appropriate governmental agencies.

Subsequent FDRC (FIG. 3A) contingent processes initiate a link from hierarchy alert routing 49 (through link [98]) to initiate flight recorder query 62, flight recorder query code 63, multi-channel SatCom transceiver 39, and subsequent inclusive SatCom communications link to the AE, where flight-recorder download to SatCom link is initiated from AE, digital compression 19 in LIFO format.

Acoustic Monitoring Sub-System

Acoustic monitoring continually monitors all sounds within confines of flight deck or controlled space. This includes radio or intercom communication between flight crew or between authorized personnel and remote locations such as ATC.

Elements of the acoustic monitoring sub-system are depicted in FIG. 2 and include one or more inconspicuously mounted microphones 29 sufficient to detect all ambient sounds within confines of the flight deck or controlled space of the aircraft.

Speaker verification biometric system 30, comparator database 33, automatic alert code 34 the latter of which comprises means of initiating specified alert code(s) contingent upon specific prerequisite conditions. Any resulting alert code (if applicable) is identified by signal path marked ALERT 35.

Digital encoder 7 receives and delimits ALERT 35, which is indexed to date, time and positional data. Relational nature of alert codes to these identifiers permit reconstruction of events preceding and subsequent to any applicable alert.

Flight recorder sub-system elements 9, 19 and 20 and communication related elements 21 and 23 process and record accumulated data including alert codes separately or in addition to audio and/or video. Operation of the flight recorder sub-system is independent in operation but ancillary to the function and processing of all AE systems, such as acoustic monitoring, recording of audio, video and alert codes corresponding to detected anomalies.

Continual monitoring of acoustic, ambient environment of the flight deck or controlled space is sufficient to detect any voices, utterances or sounds and compare them against logged voices of authorized personnel stored in the comparator database 33 and secure temporary memory element of the speaker verification biometric system 30.

The secure temporary memory maintains reference of intrinsic characteristics of authorized personnel operating within the cockpit or controlled space, and provides means of detecting any differing voice or utterance. This temporary record is maintained for the duration of the flight and is deleted upon successful biometric authorization of replacement personnel. Duration of acoustic monitoring is continual until conclusion of the flight, and rank/position and name log off of the current crew.

In addition to record of individual intrinsic elements of speech, particular to personnel authorized to occupy the flight deck or controlled space, the comparator database 33 also maintains a record of extended personnel, such as flight attendants or officers, who may on occasion have limited access to flight deck or controlled space, during the inclusive time period acoustic monitoring sub-system is in operation.

The flight deck door is equipped with a means of producing a brief audible sound, indicating the door has been opened. Once detected, the speaker verification biometric system 30, states, "IDENTIFY." The person opening the door responds with title and name, for example, "Flight Attendant, Judy Morrison."

The speaker verification biometric system 30 then compares the spoken words with speech recorded in the comparator database 33. If the words match the recorded data for that employee, no action is taken, other than logging the ingress and egress of the employee. If the voice is not detected, the system would again prompt "IDENTIFY" If a second response fails to match the comparator database 33, then an alert is transmitted through the SatCom communications link to the FDRC.

Any non-authorized voice detected by acoustic monitoring is sufficient to generate an automatic alert (Code 7500), which is forwarded to the FDRC by the SatCom communications link.

The alert signal is received by the FDRC (FIG. 3A), antenna 38, and transferred to the multi-channel SatCom transceiver 39, aircraft alert code processing 53 and comparison with system parameters 54, which determine whether the issued alert code is within defined parameters. Decision diamond 55 determines whether the alert received from the aircraft AE matches or exceeds criteria. In the event an alert code origin corresponds to detection of an unauthorized voice in the controlled space, then the decision diamond would return a NO.

If the decision diamond 55 returns a YES, alert verification process then references the alert signal to the alert status verification block 56 which compares detected voice(s) with the time/data indexed system log 60. If the detected voice matches recorded attributes of a given voice indicating authorization for the controlled area, then the decision diamond 58 returns a NO and the process would proceed to terminate alert and log 59.

If detected voice does not match any recorded voice in the time/data indexed system log 60, then the decision diamond 58 returns a YES, indicating the alert is valid.

The alert would then be transferred to hierarchy alert routing 49 for determining the corresponding agency or law enforcement entity dictated to receive notification of a compromise of the aircraft, as indicated in the block marked Notification Government/Law Enforcement Agencies 51.

The processing identified in blocks 49 and 51 above are transferred through connecting links 98 and 99, to FIG. 3B.

Processing steps disclosed in FIG. 3B derive prerequisite signals from FIG. 3A, resulting in initiate flight recorder query 62 (FIG. 3B), and generation of a flight query code 63, which is transmitted back to the AE through SatCom link.

Once received, the AE automatically acts upon the query command and initiates the download sequence of the flight recorder sub-system.

Audio flight recorder download is then transferred from AE through the SatCom link to the FDRC (FIG. 3B), primary (alpha) satellites 25 or secondary (bravo) satellites 26, antenna 38, multi-channel SatCom transceiver 39, decision diamond 64, decompression 65 (when applicable), digital decoder (delimiter) 66 and branch router 67. It is at this juncture that audio data assumes a distinctly different path through the audio channel 69 of the branch router 67, to audio out and voice print generator 73. Associated with this block is an addressable non-volatile means of recording and archiving the digital audio recording extracted from the aircraft in audio storage 76.

Additionally processing by the audio out and voice print generator 73 includes extraction of specific intrinsic characteristics of the audio signal sufficient to produce a spectrogram (commonly called voice print) sufficient to provide means of identification of the originator of phrases, words or utterances which originated on the aircraft.

Analysis of characteristic aspects of speech by audio and voice print generator 73 is combined with the generation of a graphic display of the compiled spectrogram.

Figure 12:
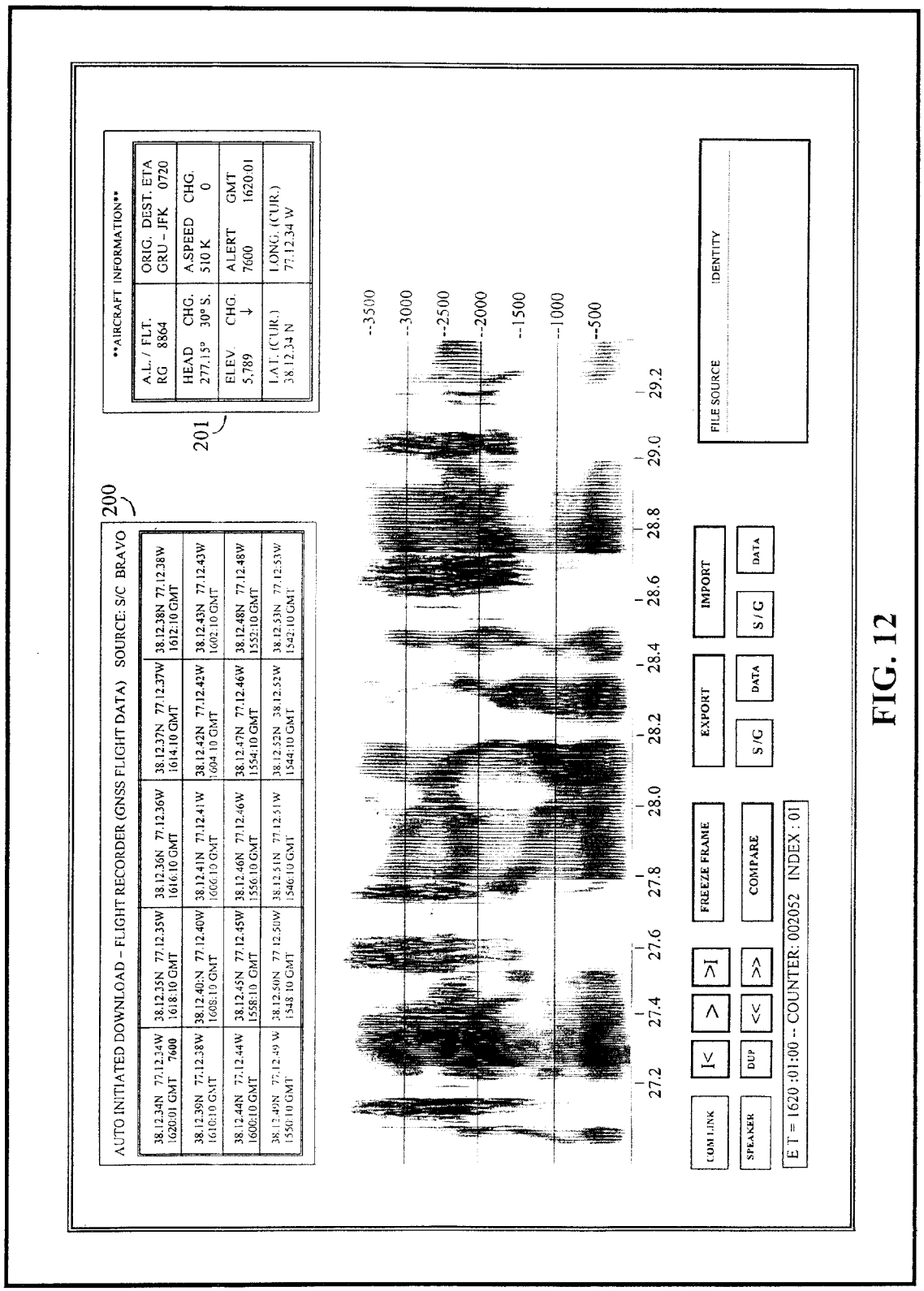
FIG. 12 illustrates the generation and graphic display of a spectrogram obtained from flight recorder downloaded audio.

FIG. 12 discloses a proposed spectrogram display generated in operation of the illustrated embodiment, which includes fully addressable inclusive contents of the audio portion of the downloaded contents of the flight recorder, indexed to sequential spectrogram frames, permitting end-users to advance or reverse audio, with concurrent dynamic display of the spectrogram corresponding to that portion of audio.

Controls are noted at the bottom of FIG. 12, demonstrating functions and controls available to the end-user, including Speaker which corresponds to an audio monitor; ComLink, which enables communication and collaborative work between parallel terminals or assigned personnel; Freeze Frame, which freezes an individual spectrogram frame; Compare, which permits comparison between FDRC produced spectrograms and reference audio data of the agency or end-user to facilitate a comparison and identification, even if displayed on two parallel terminals.

The frame at the lower-right of FIG. 12 displays description of compared spectrograms and their source. The Import and Export buttons permit transfer of S/G (Spectrograms) and Data between agencies or offices.

Event Time (ET) displays the precise date and time that the current audio and spectrogram was recorded. GNSS buffer data (FIG. 12, 200) displays precise historical latitude and longitude of the aircraft from which the flight recording was obtained, and a highlighted frame or colored box identifies the position of the aircraft, corresponding to the audio or spectrogram being reviewed. As the audio is advanced, the highlighted frame or colored box moves to the prior or following frame corresponding to the advancing or rewinding of the audio. In this manner, the end-user can focus on the events or audio that occurred in relationship to particular changes in the positional coordinates of the aircraft.

Aircraft information 201 includes additional flight specific data corresponding to the subject aircraft. Certain data remains constant, regardless of the portion of audio being reviewed. This information includes airline, flight number, origin and destination of the subject aircraft. Additional information, such as heading, airspeed, change (course deviation), altitude and lat.(cur), lon.(cur.) change incrementally as the audio is moved forward or backward. The change of data displayed in 201, corresponds to positional data displayed in 200.

Audio extracted elements and spectrogram may be provided to an encrypted Government Web Download 77 and Transmission Via Government Network 78, such as fiber-optic or other controlled communications means.

In the illustrated embodiment, recorded audio is obtained at a sample rate of 44.1 kHz mono, or 22.05 kHz stereo, thus producing an approximate frequency response range of 40-22,050 Hz for mono or approximately 40-11,025 Hz for stereo. This level of sound quality far exceeds the source quality necessary to produce a useable spectrogram. Additionally, the sampling rate and tonal range of the remotely acquired flight recorder audio is sufficient for comparison with existing databases of audio characteristics maintained by regulatory and/or government agencies.

Flight Recorder Sub-System

FIG. 2 displays essential elements associated with the flight recorder sub-system including the digital encoder 7, buffer system 9, digital compression 19, storage device 20.

Remote access features of the flight recorder sub-system include a wireless communication (SatCom) link, permitting communication of commands from FDRC to AE, enabling download of accumulated flight recorder contents back to the FDRC, from one or more constituent elements of the flight recorder sub-system (buffer system 9 digital compression 19 or storage device 20)

Buffer System

The buffer system 9 may function as a stand-alone flight recorder system or a constituent element of a multistage flight recorder sub-system. The reason for differentiation of function is based upon manner it is addressed for recording and download function. Encoded data may be recorded into the buffer system 9 and later transmitted directly from this device to FDRC through the SatCom link, or transferred indirectly through intermediate digital compression 19.

In the illustrated embodiment, buffer system 9 functions as a constituent element of the flight recorder sub-system, providing initial and incremental storage of the most current recorded data up to a defined or programmable limit of chronologically linear input data. In this latter application, buffer system 9 provides immediate and definable means of recording and accessing flight data. Maximum recording duration of the buffer system 9 exceeds existing cockpit voice recorders by 500-900%. An important feature is the ability to download data in LIFO (Last In First Out) mode. Paired with a means of compression, such as digital compression 19, audio and data may be downloaded rapidly, expediting transfer of flight recorder contents to the FDRC with most recent data transmitted first. If an event sufficient to produce an aircraft alert code occurs, FDRC may query buffer system 9, transmitting and preserving the immediate incident responsible for initiating the alert sequence.

Buffer system query or download may be selected with or without digital compression 19 and may be initiated automatically or by the pilot in response to any circumstance deemed to indicate threat of imminent harm to the aircraft. This enables preservation of flight recorder contents through satellite transmission prior to any adverse event or damage to aircraft or the recording systems onboard.

The flight recorder buffer system 9 is composed of solid state or other electronic data storage medium employing a circular queue construct enabling defined channels of data, audio and video to be recorded and/or and addressed separately. The illustrated embodiment permits user programmable maximum recordable duration of the buffer, defined by chronological time or quantity of recorded elements. Also called buffer depth, this selectable limit establishes a boundary for sequential data being recorded to the buffer, beyond which it is deleted or new data entering the buffer simply records over the oldest chronological data. The programmable depth feature is useful in establishing flight recorder times commensurate with duration of given flights. As an example, a flight of short duration need not have as much memory as a trans-continental flight.

Flow of data includes delimited incrementally sampled positional data obtained from the GNSS receiver 3 through the programmable gate 4 and digital encoder 7, combined with contingent alert 35 codes, and AGL data obtained from the RA/GPWS 5, when applicable. All data is indexed by date, time and an aircraft identifying code.

Audio 37 and video 28 data is provided separately to the fight recorder buffer system 7 through the digital encoder 7.

Function and algorithms pertaining to operation of flight recorder buffer system 9, is further described below.

Function and Algorithms

Introduction

Audio data is acquired from at least one microphone which is mounted within the cockpit, flight deck or other controlled space and is equipped with digital encoding hardware/software.

Audio data may be acquired at 44.1 kHz, which is compatible to CD quality recording and compatible with MP3 or MPEG compression. However, the number of channels and the audio sampling rate at which audio data is acquired and utilized by signal processing elements or sub-systems may differ from that employed in the illustrated embodiment. For example, audio data may be acquired in stereo at a sampling rate of 22.05 kHz, which approximates high quality FM stereo radio.

Video is acquired through one or more mounted video cameras equipped with digital encoding hardware.

Under a number of commercially available or dedicated operating systems, audio and video data acquisition driver software is installed to provide a uniform programming interface and hide timing, synchronization and implementation details from the application layer programs.

Audio and video channels are acquired and recorded separately.

Software function of the present invention calls driver read command to acquire data for further processing.

Function Overview

Time Granularity. Audio, video and alert data is recorded for a set number of seconds called a TimeUnit and is stored as a data structure called DataUnit.

Circular Queue. To prevent over-writing available memory in buffer system 9, DataUnits are organized into a circular queue. A circular queue is a data structure that keeps a list of sequential memory references to each DataUnit. When the buffer system 9 becomes full, i.e. the last DataUnit in the list has been written to, subsequent storage continues from the beginning of the queue, overwriting the oldest records. Compressed data is stored on a non-volatile recording device (data storage device 20) such as a magneto-optical drive. It is organized in an array of data structures called CpDataUnit that mirror DataUnit stored in RAM. TransmitBuffer contains a copy of all current dataUnit being transmitted to SatCom unit, avoiding possible synchronization problems due to delays in transmission.

Variables. The depth of the buffer system, BuffDepth and time granularity TimeUnit are external inputs to program.

Pointers. Several memory acquisition reference values (pointers) are defined and include:

a) data_ptr—reference to where next DataUnit is to be written to b) limit_ptr—reference to end of buffer c) fifo_ptr—reference for FIFO download of data to SatCom link d) lifo_ptr—reference for LIFO download of data to SatCom link e) index1_ptr—reference for start of indexed download of data to SatCom link f) index2_ptr—reference for end indexed download.

Algorithms

Initialization. Process input parameters BuffDepth and TimeUnit to calculate the amount of working memory required and how many entries the circular queue needs. Create circular queue data structure in memory. Initialize limit_ptr to last DataUnit record in queue. Set all other pointers (See Function Overview) to first record in queue.

Figure 5:
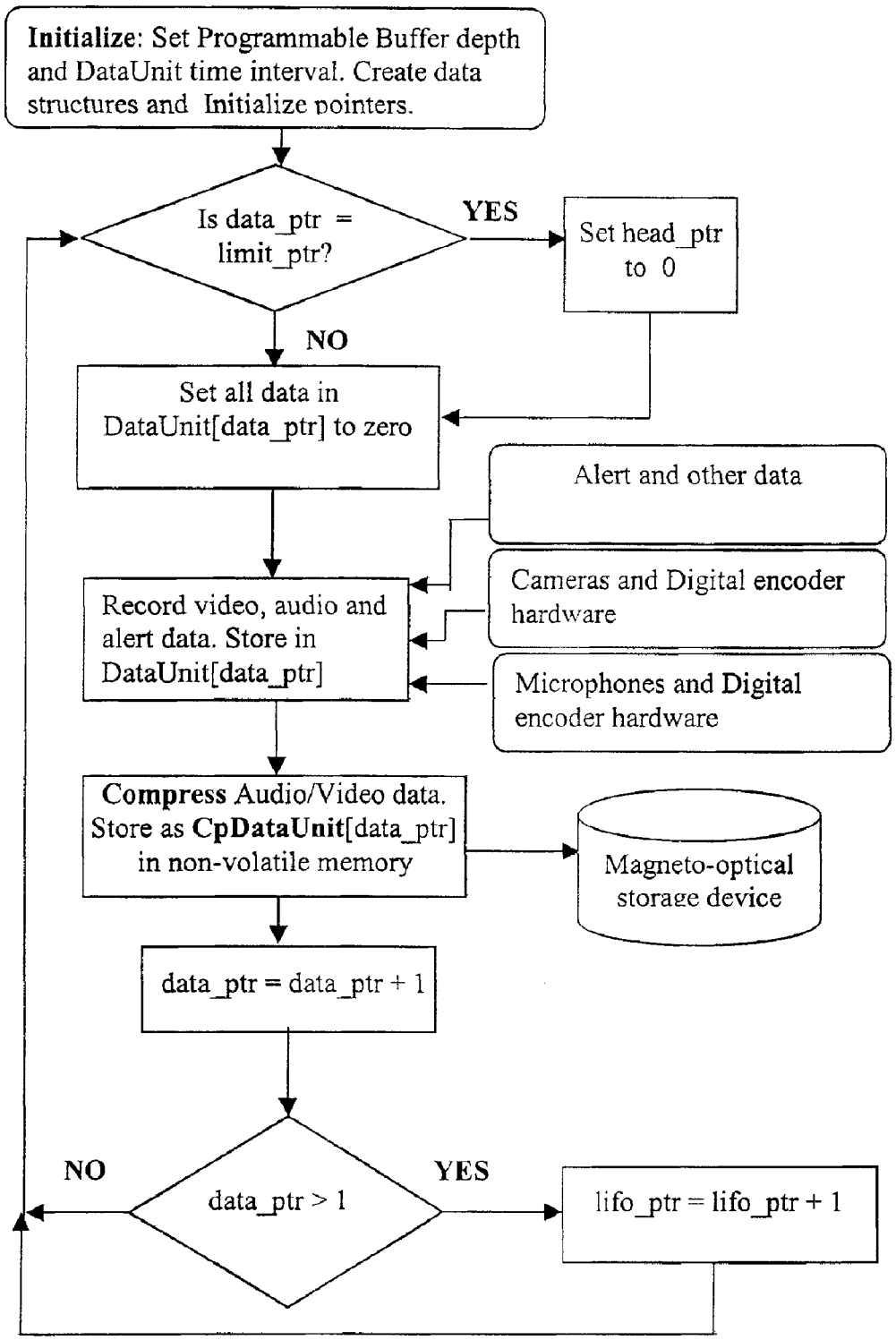
FIG. 5 is a flow chart identifying data acquisition function.

Data Acquisition from digital encoder 7. (FIG. 5) Check that data_ptr is not equal to limit_ptr. If it is, then set it to first record and begin recording over original data. Initialize records currently pointed to by data_ptr to zero. Call Read function driver routines for video, audio, and alert data. When the DataUnit[data_ptr] records have been stored in memory, call compression sub-routine for video and audio data and store CpDataUnit structure. Write CpDataUnit to non-volatile storage. Increment data_ptr. If data_ptr is greater than 1, then increment lifo_ptr. Repeat indefinitely or until stopped by program command. See FIG. 5 flowchart.

Figure 6:
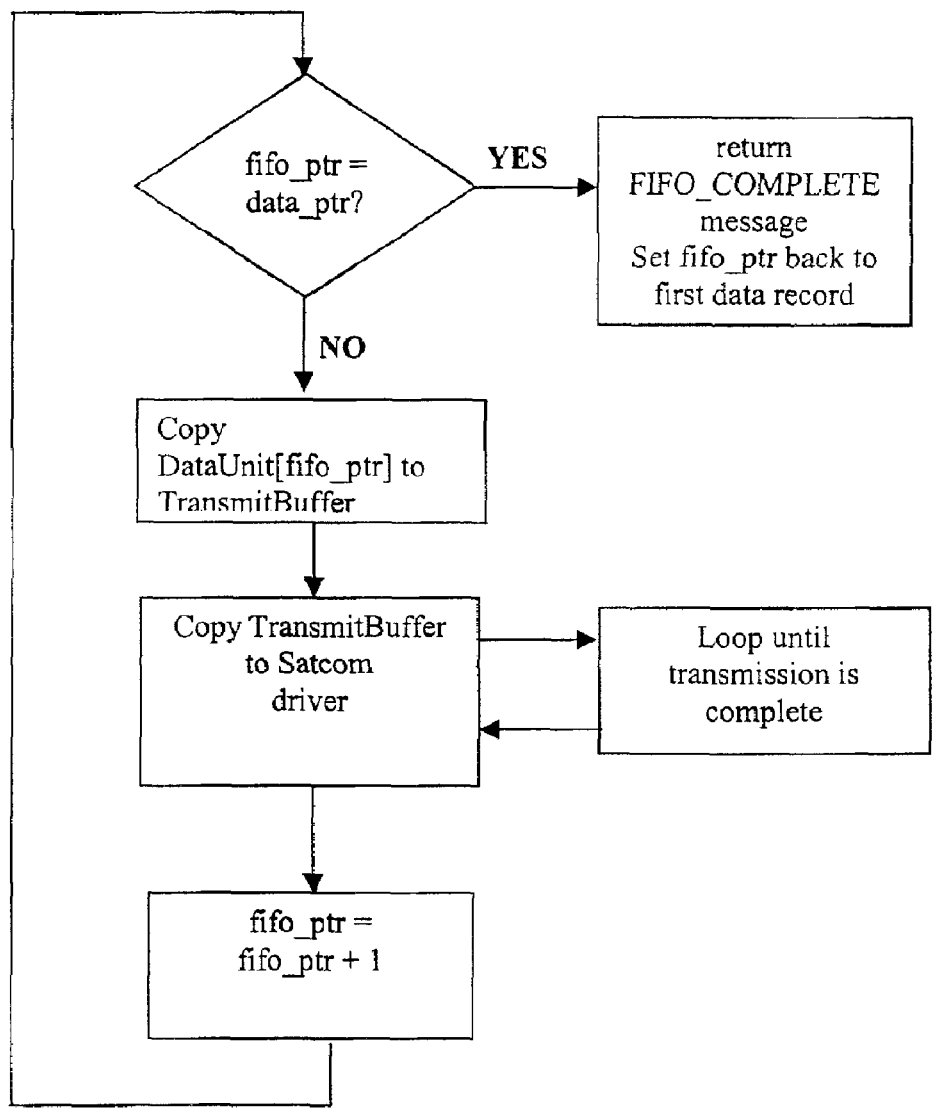
FIG. 6 is a flow chart illustrating FIFO data transfer, relative to download of the flight recorder element of the illustrated embodiment of the present invention.

FIFO Download to SatCom link. (FIG. 6), FIFO stands for First In First Out and allows FDRC to request (Query) all the data from record in the buffer system FIG. 2, number 9, until the record currently being written by the digital encoder 7 hardware software driver. When recorder query/relay 21 receives an FDRC query command to download data in FIFO format from buffer system 9, the following sequences are executed:

1. The system checks to see if fife_ptr is equal to data_ptr. This indicates that data is still being written to this DataUnit block and should not be accessed. A FIFO_COMPLETE reply is issued back to ground based control (FDRC), the loop is terminated and fife_ptr is set back to the beginning of the buffer system 7.

2. The DataUnit record pointed to by fife_ptr is copied to TransmitBuffer which will hold data until SatCom interface can send it via hardware driver Write command. As there is a delay due to satellite transmission latency, the program will similarly loop or if a multi-tasking operating system is running, be put to sleep until the interface is ready to accept data.

3. When the write to SatCom operation completes, fifo_ptr is incremented and the process repeats at step 1 above until fife_ptr equals data_ptr.

Figure 7:
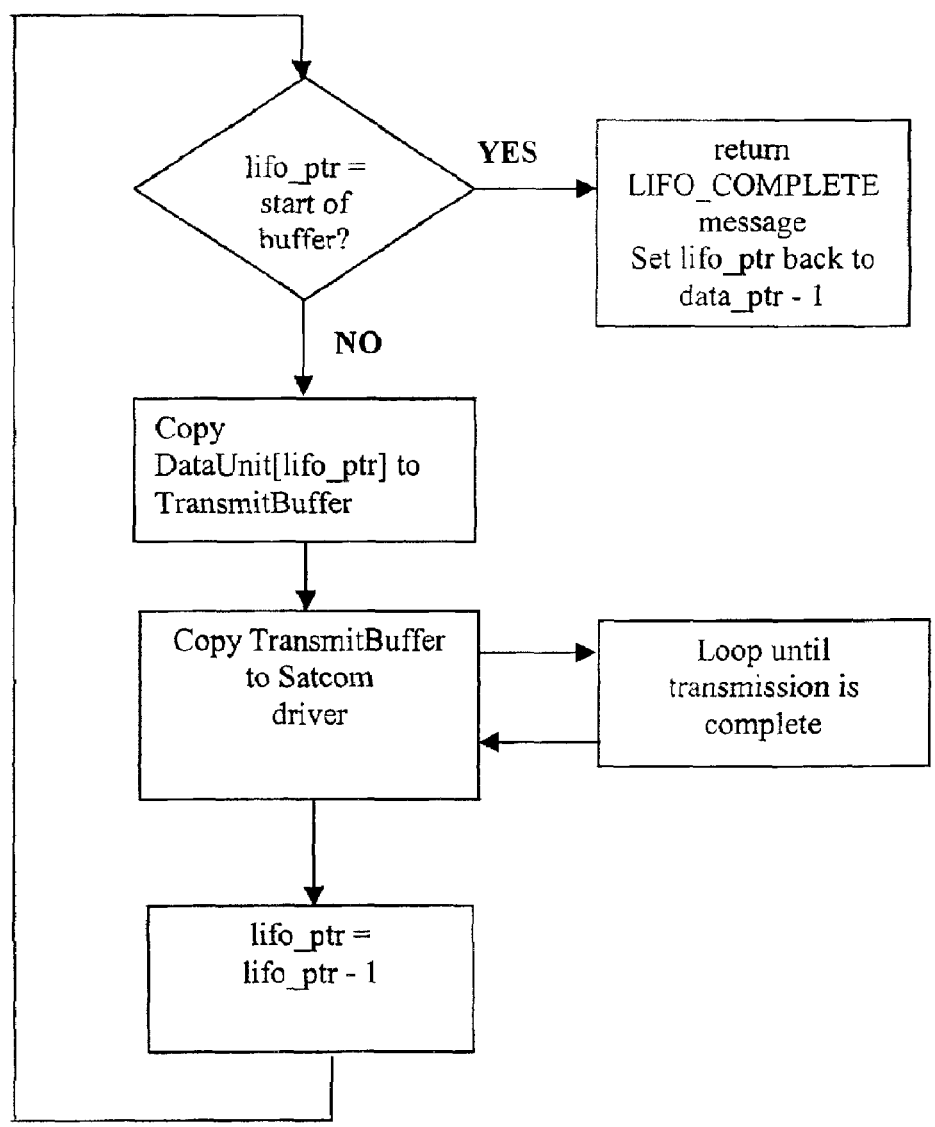
FIG. 7 is a flow chart representing LIFO data transfer, relative to download of the flight recorder element of the illustrated embodiment of the present invention.

LIFO Download to SatCom link. (FIG. 7) LIFO stands for Last In First Out and allows FDRC to query data from the most recent chronologically recorded data record to the oldest chronologically recorded data record in the buffer system 9. As shown in data acquisition algorithm section above, the lifo_ptr variable is incremented with data_ptr but points to the DataUnit record previous to the one that data is currently being written into. When the recorder query/relay 21 receives a flight recorder query command from the FDRC to download data in LIFO format from the buffer system 9, the following sequence of events are executed:

1. The system checks to see if lifo_ptr is equal to beginning of the buffer, indicating that all the data has been written and the operation is complete. A LIFO_COMPLETE reply is issued back to the FDRC through the SatCom link 2. The DataUnit record pointed to by lifo_ptr is copied to TransmitBuffer which will hold data until SatCom interface can send it via hardware driver Write command. As there is a delay due to satellite transmission latency, the program will similarly loop or if a multi-tasking operating system is running, be put to sleep until the interface is ready to accept data.

3. When the write to SatCom operation completes, lifo_ptr is decremented and the process repeats at step 1 above until lifo_ptr equals the beginning of the buffer.

Figure 8:
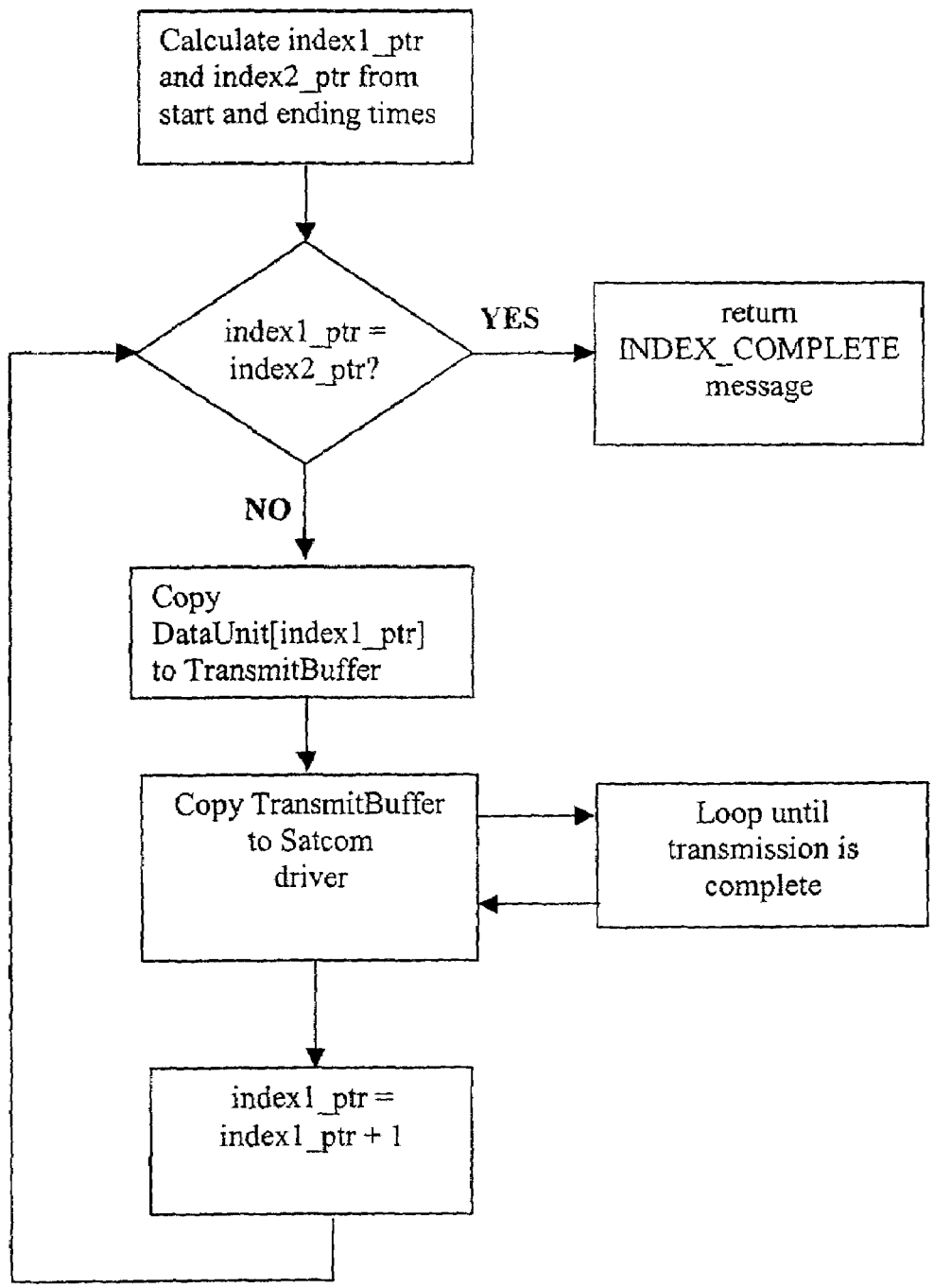
FIG. 8 is a flow chart identifying means of indexed data transfer (indexed access) relative to download of the flight recorder.

Indexed Download to Satcom link. (FIG. 8) In this case, the FDRC can request data, expressed as a single defined index or chronological reference point, or data that exists in the range between two index or chronological reference points. The sequence of steps necessary to execute an indexed download command are listed below:

1. The starting and ending times are converted to data index and assigned to index1_ptr and index2_ptr, respectively.

2. The values of index1_ptr and index2_ptr are checked to be sure that they lie within the time being recorded.

3. index1_ptr is checked to see if it is equal to index2_ptr. If it is, the operation is complete and an INDEX_COMPLETE message is sent to FDRC through the SatCom link.

4. The DataUnit record pointed to by lift_ptr is copied to TransmitBuffer which will hold data until SatCom interface can send it via hardware driver Write command. As there is a delay due to satellite transmission latency, the program will similarly loop or if a multi-tasking operating system is running, be put to sleep until the interface is ready to accept data.

5. index_ptr is incremented and the process repeats at step 1 above until index1_ptr equals the index2_ptr.

Compression

Digital compression (FIG. 2, 19) is a selectable dependent element and function associated with the download process of buffer system 9. Additionally, digital compression compresses all digital data, audio and video data prior to being recorded in the non-volatile recording medium identified as storage device 20.

One of a number of existing compression algorithms are utilized in the processes of reducing data storage size and bandwidth, including but not limited to MP3, MPEG, and Motion J-PEG for video.

Data Storage Device—(Magneto-Optical)

The flight recorder storage device 20 provides functional aspects of a stand-alone flight recorder when coupled with digital compression 19 or as a constituent of the broader flight recorder sub-system of the illustrated embodiment.

In either application, the data recording means identified in the illustrated embodiment employs a non-volatile recording medium, such as magneto-optical, enabling substantially longer recording times compared to existing flight recorders. Current magneto-optical technology permits up to 9GP of storage space in a removable platter medium, permitting removal and replacement at the conclusion of a given period of time or following an incident or accident involving the subject aircraft in which the device is installed.

In one embodiment of the present invention, the data storage device is housed within a crash-survivable enclosure.

Digitally encoded data is recorded in a sequentially timed linear order and is recorded in a single channel of the storage device 20. Audio and video are input as separate channels and may be recorded on separate tracks or even separate platters of the magneto-optical recording medium.

Storage device 20 provide accessible means of archiving data which exceed depth of buffer system 9. Input data which is recorded in storage device 20 is first compressed to reduce the space occupied by the data and eliminate need for compression prior to transmission to FDRC through inclusive elements of the SatCom link.

Selectable means of download from the storage device 20 include, but are not limited to, FIFO (First In, First Out), LIFO (Last In First Out) or Indexed Access.

By incorporating storage device 20 into the flight recorder sub-system, it reduces need to set the depth of the buffer system 9 at a high level, since direct or supplemental access of archived data is possible through the storage device 20. The buffer system 9 provides a robust and more rapidly addressable and accessible architecture than storage device 20 ideally suited for storing more current data, downloadable in FIFO, LIFO or indexed access as compressed or non-compressed data. The recording medium of storage device 20 has slower access time but provides optimum non-volatile archival means that may contain selectably higher resolution video and audio than buffer system 9.

Incorporation of both buffer system 9 and storage device 20 provides three-fold fail-safe for recorded data, permitting remote retrieval from either or both recording elements while the aircraft is airborne and/or later physical retrieval of the magneto-optical cartridge from storage device 20.

FDRC Processing and Dissemination

FDRC elements (FIG. 3B, numbers 38, 39) receive all transmitted data and process it in the following manner: The decision diamond 64 determines if the incoming data is either compressed or not. If compressed, a YES is returned which transfers the data through decompression 65 to the digital decoder (delimiter) 66. If incoming data is not compressed, the decision diamond returns a NO, and the data is transferred directly to the digital decoder (delimiter) 66. This block decodes data into its respective original form(s) by removing delimiting characters that divide data into its individual elements [date, time; sample rate, aircraft identifier; latitude, longitude; altitude; AGL and alert code, (if applicable)].

The digital decoder (delimiter) 66 operates in conjunction with the branch router 67 in defining and parsing data into separate pathways relative to the type of data, including branch router categories of data 68, audio 69 and video 70. Individual channels or paths of audio and video data received from the aircraft maintain data and chronological identifiers, including but not limited to date-time index markers and positional data sufficient to precisely correlate the recordings in relationship to the time and location of the aircraft at the time the recordings were made. Processing of audio and video signals through the branch router 67 and subsequent audio and video processing elements include this reference data.

Delineated video signal elements are transferred from the branch router to the video compiler 72, which interprets resulting signal into a format sufficient to be recorded in an electronically addressable non-volatile archival video storage 75 and transmitted through encrypted Government Web Download 77 to regulatory and/or law enforcement agencies by means of Government End User Decryption. The purpose of this download is to provide key individuals of given agencies or offices immediate yet controlled access to downloaded data, relative to an incident involving the aircraft, regardless of the respective official's location at the time an incident occurs.

The invention claimed is:

1. A flight recorder system with remote wireless access, for use aboard an aircraft having a cockpit, comprising:
    a microphone means within the cockpit for producing digital audio data,
    an indexing means for indexing the digital audio data relative to aircraft position and time,
    a data storage means for storing the digital audio data, and
    a wireless means for receiving a download command specifying at least one index value and, in response to the download command, reading data from the data storage means in an indexed access mode utilizing said at least one index value, and transmitting the indexed-access data to a ground-based facility for evaluation.

2. A flight recorder system according to claim 1, comprising a compression means for receiving the data from the data storage means and compressing the data prior to download.

3. A flight recorder system according to claim 1, wherein the data storage means comprises a data buffer means for receiving and temporarily storing the digital audio data and related position and time data.

4. A flight recorder system according to claim 1, comprising a camera for acquiring images within the aircraft and storing image data in the data storage means for subsequent download.

5. A combined airborne and ground-based system for monitoring an aircraft comprising:
    an airborne flight recorder that comprises a microphone means for detecting sounds within a cockpit of the aircraft and producing digital audio data, an indexing means for indexing the digital audio data relative to aircraft position and time, a data storage means for storing the digital audio data, and a means for receiving a download command responsive to an anomaly detected on the aircraft, sufficient to produce an alert and, in response to the download command, reading data from the data storage means in indexed access and transmitting the data wirelessly, and
    a ground-based facility for receiving, processing and evaluating the data transmitted by the means for receiving the download command.

6. A system according to claim 5, comprising a means aboard the aircraft for analyzing digital audio data produced by the microphone means and in the event of detecting an anomaly in the digital audio data, generating a download command.

7. A system according to claim 1, wherein the microphone means comprises multiple microphones for producing respective digital audio data streams and the data storage means has multiple channels for storing the digital audio data streams respectively.

8. A system according to claim 1, wherein the data storage means comprises a circular queue.

9. A combined airborne and ground-based system for monitoring an aircraft comprising:
   an airborne flight recorder that comprises a microphone means for detecting sounds within a cockpit of the aircraft and producing digital audio data, an indexing means for indexing the digital audio data relative to aircraft position and time, a data storage means for storing the digital audio data, and a means for receiving a download command and, in response to the download command, reading data from the data storage means in one of LIFO or indexed access and transmitting the data wirelessly, and
   a ground-based facility for receiving, processing and evaluating the data transmitted by the means for receiving the download command,
   and wherein the system further comprises a means for monitoring the indexing means, relative to the advancing time and position of the aircraft and generating the download command in the event the monitored advancing position of the aircraft projects inevitable intersection with terrain or terrestrial features.

10. A combined airborne and ground-based system for monitoring an aircraft comprising:
    an airborne flight recorder that comprises a microphone means for detecting sounds within a cockpit of the aircraft and producing digital audio data, an indexing means for indexing the digital audio data relative to aircraft Position and time, a data storage means for storing the digital audio data, and a means for receiving a download command responsive to an anomaly detected on the aircraft, sufficient to produce an alert and, in response to the download command, reading data from the data storage means in one of LIFO or indexed access and transmitting the data wirelessly, and
    a ground-based facility for receiving, processing and evaluating the data transmitted by the means for receiving the download command,
    and wherein the airborne flight recorder comprises a means for analyzing digital audio data produced by the microphone means and, in the event of detecting an anomaly in the digital audio data, generating an alert message and transmitting the alert message to the ground based facility, and the ground based facility includes a means for evaluating the alert message and, in the event that predetermined conditions are met, generating the download command and transmitting the download command to the flight recorder.

11. A system according to claim 5, wherein the means for receiving the download command is responsive to a download command specifying at least two index values and reads data from the data storage means utilizing said two index values.

12. A system according to claim 11, in which the data to be read from the storage means is defined as a range of data existing between the at least two index values.

13. A system according to claim 12, in which the at least two index values correspond to individual chronological reference points associated with the range of data.

14. A system according to claim 13, in which the at least two index values define a starting point and an ending point for reading the defined range of data from the storage means in response to a download command.

15. A system according to claim 1, wherein the means for receiving the download command specifies at least two index values and reads data from the data storage means in a range of data between the at least two index values.

16. A system according to claim 15, in which the at least two reference points individually define a starting point and an ending point for reading the range of data from the storage means, in response to a download command.

17. A flight recorder system according to claim 3, wherein the data buffer means is of variable depth.

18. A flight recorder system according to claim 3, further comprising a non-volatile memory for receiving data from the data buffer means.

19. A flight recorder system according to claim 18, comprising a compression means for receiving the data from the data buffer means and compressing the data prior to storage in the non-volatile memory.

* * * * *